(12) United States Patent
Tan et al.

(10) Patent No.: US 11,347,128 B2
(45) Date of Patent: May 31, 2022

(54) DISPLAY APPARATUS AND METHOD OF DRIVING DISPLAY APPARATUS

(71) Applicant: BOE Technology Group Co., Ltd., Beijing (CN)

(72) Inventors: Jifeng Tan, Beijing (CN); Xiandong Meng, Beijing (CN); Wei Wang, Beijing (CN); Jian Gao, Beijing (CN); Wenqing Zhao, Beijing (CN); Xiaochuan Chen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 640 days.

(21) Appl. No.: 16/332,519

(22) PCT Filed: Nov. 23, 2018

(86) PCT No.: PCT/CN2018/117116
§ 371 (c)(1),
(2) Date: Mar. 12, 2019

(87) PCT Pub. No.: WO2019/200917
PCT Pub. Date: Oct. 24, 2019

(65) Prior Publication Data
US 2021/0364880 A1    Nov. 25, 2021

(30) Foreign Application Priority Data
Apr. 20, 2018  (CN) .......................... 201810360480.0

(51) Int. Cl.
*G09G 5/02* (2006.01)
*G02F 1/29* (2006.01)
(Continued)

(52) U.S. Cl.
CPC ........... *G02F 1/292* (2013.01); *G02B 6/0031* (2013.01); *G02B 6/0035* (2013.01);
(Continued)

(58) Field of Classification Search
USPC .......................... 345/690, 691, 694, 89, 102
See application file for complete search history.

(56) References Cited

U.S. PATENT DOCUMENTS 10,013,926 B2 *  7/2018  Kim ..................... G09G 3/3607
10,593,252 B1 *  3/2020  Chappalli ............ G09G 3/2055
(Continued)

FOREIGN PATENT DOCUMENTS

CN      106292051 A    1/2017
CN      106292052 A    1/2017
(Continued)

OTHER PUBLICATIONS

First Office Action in the Chinese Patent Application No. 201810360480. 0, dated Jun. 1, 2020; English translation attached.

*Primary Examiner* — Thuy N Pardo
(74) *Attorney, Agent, or Firm* — Intellectual Valley Law, P.C.

(57) ABSTRACT

A display apparatus. The display apparatus includes a back light module; a light transmission direction controller on a light emitting side of the back light module; and a plurality of subpixels on a side of the light transmission direction controller away from the back light module, each individual one of the plurality of subpixels including a light transmissive part and a light blocking part. The back light module is configured to emit light toward the plurality of subpixels. The light transmission direction controller is configured to independently adjust a grayscale of each individual one of the plurality of subpixels by independently controlling a light distribution ratio between a first portion of light transmitted through the light transmissive part and a second portion of light blocked by the light blocking part in each individual one of the plurality of subpixels.

19 Claims, 15 Drawing Sheets

(51) Int. Cl.
    *F21V 8/00*     (2006.01)
    *G09G 3/34*     (2006.01)
    *G09G 3/36*     (2006.01)

(52) U.S. Cl.
    CPC ......... *G02B 6/0055* (2013.01); *G09G 3/3406* (2013.01); *G09G 3/3607* (2013.01); *G02F 2201/12* (2013.01); *G09G 2300/0465* (2013.01); *G09G 2320/02* (2013.01)

(56) References Cited

U.S. PATENT DOCUMENTS

| | | | |
|---|---|---|---|
| 2007/0216636 A1* | 9/2007 | Lo | G09G 3/3406 345/102 |
| 2008/0272999 A1* | 11/2008 | Kurokawa | G09G 3/3406 345/89 |
| 2013/0044146 A1* | 2/2013 | Kurokawa | G09G 3/3406 345/690 |
| 2014/0152724 A1* | 6/2014 | Park | G09G 3/3413 345/694 |
| 2015/0116381 A1* | 4/2015 | Kim | G09G 3/3607 345/691 |
| 2016/0155390 A1 | 6/2016 | Son et al. | |
| 2018/0012535 A1* | 1/2018 | Kobayashi | G09G 3/2007 |
| 2018/0176452 A1* | 6/2018 | Nikkanen | H04N 5/3696 |
| 2018/0180941 A1* | 6/2018 | Zhang | G02F 1/133602 |
| 2018/0233107 A1* | 8/2018 | Wu | G09G 3/3607 |
| 2018/0336840 A1* | 11/2018 | Niikura | C09K 19/02 |
| 2019/0086699 A1 | 3/2019 | Wang et al. | |
| 2019/0094447 A1 | 3/2019 | Tan et al. | |
| 2019/0094575 A1* | 3/2019 | Wang | G02B 30/33 |
| 2019/0129082 A1* | 5/2019 | Li | G02F 1/13306 |
| 2019/0206340 A1* | 7/2019 | Guan | G09G 3/3607 |

FOREIGN PATENT DOCUMENTS

| | | |
|---|---|---|
| CN | 106681047 A | 5/2017 |
| CN | 107238974 A | 10/2017 |
| CN | 107621729 A | 1/2018 |
| CN | 107817629 A | 3/2018 |

* cited by examiner

DISPLAY APPARATUS AND METHOD OF DRIVING DISPLAY APPARATUS

CROSS-REFERENCE TO RELATED APPLICATION

This application is a national stage application under 35 U.S.C. § 371 of International Application No. PCT/CN2018/117116, filed Nov. 23, 2018, which claims priority to Chinese Patent Application No. 201810360480.0, filed Apr. 20, 2018, the contents of which are incorporated by reference in the entirety.

TECHNICAL FIELD

The present invention relates to display technology, more particularly, to a display apparatus and a method of driving a display apparatus.

BACKGROUND

Nowadays, electronic display apparatuses are wildly used in people's daily life. Due to structural limitations of the display apparatuses, it is difficult to further enhance the aperture ratio of the display apparatuses. In addition, some elements in a display apparatus, such as a polarizer, may reduce the light transmittance of the display apparatus, which lowers the light utilization rate, increases the power consumption, and negatively affects the brightness of an image displayed by the display apparatus. The low light transmittance of the display apparatus also limits the development of the transparent display technology.

SUMMARY

In one aspect, the present invention provides a display apparatus, comprising a back light module; a light transmission direction controller on a light emitting side of the back light module; and a plurality of subpixels on a side of the light transmission direction controller away from the back light module, each individual one of the plurality of subpixels comprising a light transmissive part and a light blocking part; wherein the back light module is configured to emit light toward the plurality of subpixels; and the light transmission direction controller is configured to independently adjust a grayscale of each individual one of the plurality of subpixels by independently controlling a light distribution ratio between a first portion of light transmitted through the light transmissive part and a second portion of light blocked by the light blocking part in each individual one of the plurality of subpixels.

Optionally, the light transmission direction controller comprising a liquid crystal layer and a plurality of liquid crystal control electrodes configured to independently control a state of the liquid crystal layer in each individual one of the plurality of subpixels, thereby independently controlling the light distribution ratio in each individual one of the plurality of subpixels.

Optionally, the plurality of liquid crystal control electrodes are configured to control the liquid crystal layer to form a liquid crystal lens layer.

Optionally, the plurality of liquid crystal control electrodes are configured to control the liquid crystal layer to form a liquid crystal grating.

Optionally, the display apparatus further comprises a plurality of grayscale gratings in the liquid crystal layer and respectively in the plurality of subpixels; wherein the plurality of liquid crystal control electrodes are configured to independently adjust an equivalent refractive index of the liquid crystal layer in each individual one of the plurality of subpixels, thereby independently adjusting a difference between the equivalent refractive index of the liquid crystal layer and a refractive index of a respective one of the plurality of grayscale gratings in each individual one of the plurality of subpixels.

Optionally, each individual one of the plurality of subpixels has a first image display state and a second image display state; in the first image display state, the equivalent refractive index of the liquid crystal layer is adjusted to be substantially same as the refractive index of the respective one of the plurality of grayscale gratings; and in the second image display state, the equivalent refractive index of the liquid crystal layer is adjusted to be greater than the refractive index of the respective one of the plurality of grayscale gratings.

Optionally, the back light module comprises a light source assembly; and a light extraction layer on a light emitting side of the light source assembly and configured to extract light out of the light source assembly along a controlled direction.

Optionally, the light source assembly comprises alight guide plate having a first main surface and a second main surface facing each other, and a first side surface connecting the first main surface facing the light transmission direction controller and the second main surface facing away the light transmission direction controller; and a light source configured to emit light into the light guide plate through the first side surface; wherein the light extraction layer comprises a plurality of light extraction gratings on one of the first main surface and the second main surface, and configured to extract light emitted from the light source into the light guide plate out of the light guide plate.

Optionally, the light source assembly is configured so that the light emitted from the light source into the light guide plate is totally reflected in the light guide plate, and is extracted out of the light guide plate by the plurality of light extraction gratings.

Optionally, the first main surface is the light emitting side; and the plurality of light extraction gratings are configured to extract light out of the light guide plate along a direction substantially perpendicular to the light emitting side.

Optionally, the first main surface is the light emitting side; and the plurality of light extraction gratings are configured to extract light out of the light guide plate, at least a portion of extracted light being transmitted along a direction inclined to the light emitting side.

Optionally, each of the plurality of light extraction gratings in a respective one of the plurality of subpixels comprises a first sub-grating, a second sub-grating, and a third sub-grating; and wherein, in one image display state of a respective one of the plurality of subpixels, the second sub-grating is configured to extract light out of the light guide plate along a direction substantially perpendicular to the light emitting side, each of the first sub-grating and the third sub-grating is configured to extract light out of the light guide plate along a direction inclined to the light emitting side, and light extracted by the first sub-grating and the third sub-grating converges with light extracted by the second sub-grating.

Optionally, the plurality of light extraction gratings are a plurality of transmissive-type gratings on the first main surface; wherein the back light module further comprises a filing layer filling gaps in the plurality of light extraction gratings to form a planarized surface; and a refractive index of the filing layer is less than a refractive index of the light guide plate.

Optionally, the plurality of light extraction gratings are a plurality of reflective-type gratings on the second main surface.

Optionally, the light guide plate has a second side surface facing the first side surface; and the back light module further comprises a light absorption layer on the second side surface configured to absorb light transmitted to the second side surface.

Optionally, the light source further comprises a first reflective mirror and a second reflective mirror, the first reflective mirror is configured to reflect light from a light illuminant to transmit along a first direction; the second reflective mirror is configured to reflect at least a portion of light reflected by the first reflective mirror to transmit along a second direction; and the second reflective mirror has a substantially flat reflective surface.

Optionally, each individual one of the plurality of subpixels comprises a single light transmissive part; and the light blocking part is on a side of the single light transmissive part.

Optionally, each individual one of the plurality of subpixels comprises two light transmissive parts; and the light blocking part is between the two light transmissive parts.

Optionally, the display apparatus further comprises a color filter in the light transmissive part; and the color filter is a quantum dots color filter.

In another aspect, the present invention provides a method of driving a display apparatus, wherein the display apparatus comprises a back light module; a light transmission direction controller on a light emitting side of the back light module; and a plurality of subpixels on a side of the light transmission direction controller away from the back light module, each individual one of the plurality of subpixels comprising a light transmissive part and a light blocking part; wherein the back light module is configured to emit light toward the plurality of subpixels; and the light transmission direction controller is configured to independently adjust a grayscale of each individual one of the plurality of subpixels by independently controlling a light distribution ratio between a first portion of light transmitted through the light transmissive part and a second portion of light blocked by the light blocking part in each individual one of the plurality of subpixels; wherein the method comprises independently controlling a respective one of the plurality of subpixels to be in a first image display state or in a second image display state by the light transmission direction controller; wherein, in the first image display state, the light transmission direction controller is configured to control light emitted toward the respective one of the plurality of subpixels to be substantially blocked by the light blocking part of the respective one of the plurality of subpixels; and in the second image display state, the light transmission direction controller is configured to control light emitted toward the respective one of the plurality of subpixels to at least partially transmit through the light transmissive part of the respective one of the plurality of subpixels.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
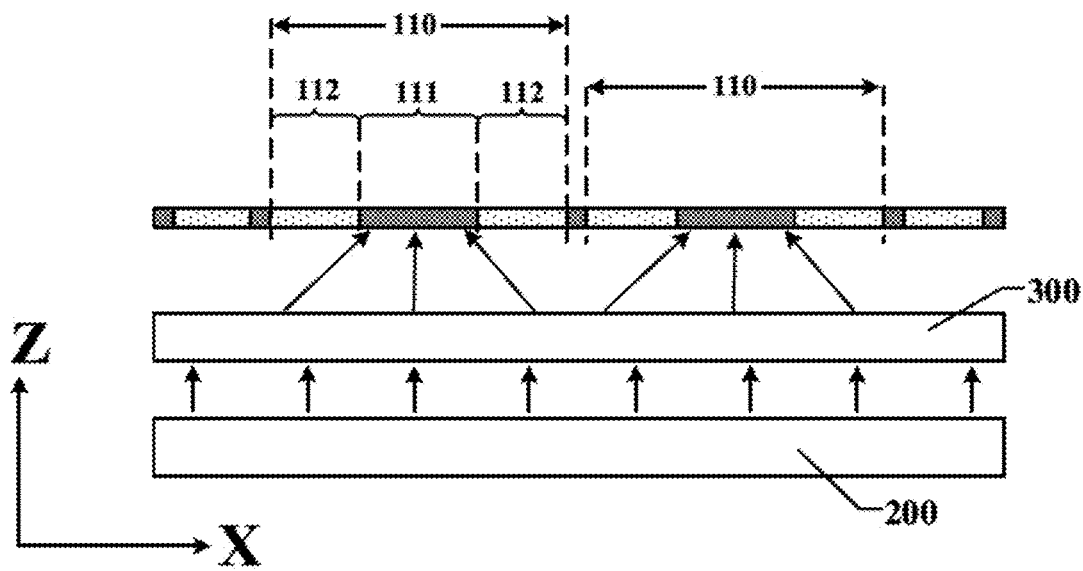
FIG. 1 is a schematic diagram showing a structure of a display apparatus in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Typically, two polarizers, including a lower polarizer and an upper polarizer, are required in a liquid crystal display apparatus. The presence of the polarizers leads to a low overall light transmittance of the liquid crystal display apparatus (e.g. usually around 33%). In addition, in order to enhance the uniformity of light emitted, optical films are disposed in a liquid crystal display apparatus, such as a prism film, a scattering film, or a reflective sheet. These optical films further decrease the light transmittance of the liquid crystal display apparatus, and have negative effects on the display quality. Due to the structural limitations, it is difficult for background light (e.g. the ambient light on a non-display side of the liquid crystal display apparatus) to pass through the liquid crystal display apparatus, therefore, the liquid crystal display apparatus is not suitable to be adapted as a transparent display apparatus. Also, due to the structural limitations, it is also difficult to increase the pixel aperture ratio of the liquid crystal display apparatus. These shortcomings present bottleneck for further enhancing the display quality in the liquid crystal display apparatus.

Accordingly, the present disclosure provides, inter alia, a display apparatus and a method of driving a display apparatus that substantially obviate one or more of the problems due to limitations and disadvantages of the related art. In one aspect, the present disclosure provides a display apparatus. In some embodiments, a display apparatus includes a back light module; a light transmission direction controller on a light emitting side of the back light module, a plurality of subpixels on a side of the light transmission direction controller away from the back light module, each individual one of the plurality of subpixels including a light transmissive part and a light blocking part. Optionally, the back light module is configured to emit light toward the plurality of subpixels. Optionally, the light transmission direction controller is configured to independently adjust a grayscale of each individual one of the plurality of subpixels by independently controlling a light distribution ratio between a first portion of light transmitted through the light transmissive part and a second portion of light blocked by the light blocking part in each individual one of the plurality of subpixels. Optionally, the light transmission direction controller is configured to independently control a light transmission direction of light emitted from the back light module to independently adjust an amount of light transmitted through the light transmissive part of each individual one of the plurality of subpixels, thereby independently adjusting a grayscale of each individual one of the plurality of subpixels. In one example, the area of the light transmissive part of each of plurality of subpixels is fixed, the more the first portion of light transmitted through the light transmissive part, the brighter the respective one of the plurality of subpixels. The gray scale of one of the plurality of subpixels can be adjusted by changing the amount of light transmitted through the light transmissive part of the respective one of plurality of subpixels.

In some embodiments, the light transmission direction controller can control a light distribution ratio of a first portion of light transmitted through the light transmissive part to a second portion of light blocked by the light blocking part in each individual one of the plurality of subpixels. Optionally, no polarizer will be disposed on the display apparatus, the light transmittance of the display apparatus is increased, and the brightness of an image displayed by the display apparatus in enhanced. In some embodiments, the light transmission direction controller is configured to independently control a light transmission direction of light emitted from the back light module to independently adjust an amount of light transmitted through the light transmissive part of each individual one of the plurality of subpixels to control the gray scale of each individual one of the plurality of subpixels. Optionally, the light transmission direction controller is configured to independently control a light transmission direction of light emitted from the back light module to adjust an amount of light transmitted through the light blocking part of each individual one of the plurality of subpixels to control the gray scale of each individual one of the plurality of subpixels. In one example, the area of the light blocking part in each individual one of the plurality of subpixels can be reduced. The area ratio of the light blocking part in each individual one of the plurality of subpixels is reduced, the aperture ratio of each individual one of the plurality of subpixels is increased, and the brightness of an image displayed by the display apparatus is enhanced In some embodiments, the light transmission direction controller is configured to independently control each individual one of the plurality of subpixels to be in a first state or in a second state. In at least one of the plurality of subpixels, in the first state, the light transmission direction controller is configured to control light emitted toward a respective one of the plurality subpixels to be substantially blocked by the light blocking part of the respective one of the plurality of subpixels; in the second state, the light transmission direction controller is configured to control at least a portion of light emitted toward the respective one of the plurality of subpixels to transmit through the light transmissive part of the respective one of the plurality of subpixels.

In some embodiments, the first state is a dark state, and the second state is a bright state. In one example, in the first state, no light is transmitted through the light transmissive part of the respective one of plurality of subpixels. The respective one of plurality of subpixels is in dark state. In another example, in the second state, at least a portion of light is transmitted through the light transmissive part of the respective one of the plurality of subpixels. The respective one of the plurality of subpixels is in bright state. For example, the gray scale of the respective one of the plurality of subpixels can be controlled by changing the portion of light transmitted through the light transmissive part of the respective one of the plurality of subpixels.

The light transmission direction controller is configured to independently controlling the light distribution ratio between the first portion of light transmitted through the light transmissive part and the second portion of light blocked by the light blocking part in each individual one of the plurality of subpixels. Optionally, in the first state, the first portion of light transmitted through the light transmissive part of the respective one of the plurality of subpixels can be a small portion, as long as the small portion is within an acceptable rang. Optionally, in the first state, the first portion of light transmitted through the light transmissive part of the respective one of the plurality of subpixels is zero. Optionally, in the second state, the first portion of light transmitted through the light transmissive part of the respective one of the plurality of subpixels is more than zero.

In some embodiments, display states of each individual one of plurality of subpixels includes a bright state, and a dark state. Optionally, the bright state includes an intermediate bright state and a full bright state. For example, each individual one of plurality of subpixels has 256 gray scale levels, e.g. level 0 to level 255. In the dark state, the gray scale level of the respective one of the plurality of subpixels is level 0. In the intermediate bright state, the gray scale level of the respective one of the plurality of subpixels is in a range of level 1 to level 254, e.g. level 1 to level 50, level 50 to level 100, level 100 to level 150, level 150 to level 200, and level 200 to level 254. In a full bright state, the gray scale level of the respective one of the plurality of subpixels is in 255 level.

In some embodiments, the display apparatus can be configured to be a transparent display apparatus. For example, the back light module of the display apparatus is configured to be transparent. The background light can transmit through the display apparatus. The display apparatus can display a background image. And a user can see the background image showing background behind the display apparatus using the display apparatus. Optionally, a light emitting structure can be disposed on the back light module. Various appropriate devices may be used for making a light emitting structure. Examples of suitable devices used for making a light emitting structure include, but not limited to, a light source, a light provider, an illuminant. Optionally, an image displayed by the display apparatus is displayed using both the light from emitting structure and a background light.

In some embodiments, the display apparatus can be configured to be an opaque display apparatus. For example, the background light cannot be transmitted through a back light module into a display panel. An image displayed by the display apparatus is displayed using only the light from the light emitting structure.

In the following disclosure, at least one of the display apparatus in the present disclosure are an opaque display apparatus. And all the light is emitted from the light emitting structure of the back light module in the present disclosure.

FIG. 1 is a schematic diagram showing a structure of a display apparatus in some embodiments according to the present disclosure. Referring to FIG. 1, in some embodiments, a display apparatus includes a plurality of subpixel 110. Optionally, each individual one of the plurality of subpixels 110 include a light blocking part 111 and a light transmissive part 112. The display apparatus further includes a back light module 200 configured to emit light toward the plurality of subpixels 110; a light transmission direction controller 300 on a light emitting side of the back light module. Optionally, the light transmission direction controller 300 is between the plurality of subpixels 110 and the back light module 200. Optionally, the light transmission direction controller 300 is configured to independently adjust a grayscale of each individual one of the plurality of subpixels 110 by independently controlling a light distribution ratio between a first portion of light transmitted through the light transmissive part 112 to a second portion of light blocked by the light blocking part 111 in each individual one of the plurality of subpixels 110. Optionally, the light transmission direction controller 300 is configured to independently control each individual one of the plurality of subpixels 110 to be in a first state or in a second state.

In one example, in the first state, the light transmission direction controller 300 is configured to control light emitted toward the respective one of the plurality subpixels 110 to be substantially blocked by the light blocking part 111 of the respective one of the plurality of subpixels. In another example, in the second state, the light transmission direction controller 300 is configured to control at least a portion of light emitted toward the respective one of the plurality of subpixels 110 to transmit through the light transmissive part 112 of the respective one of the plurality of subpixels 110.

In the first state, the light transmission direction of light transmitted from the back light module 200 are adjusted toward the light blocking part 111 of the respective one of the plurality of subpixels 110. No light is transmitted out of the respective one of the plurality of subpixels 110. The respective one of the plurality of subpixels 110 is in dark state. For example, the gray scale level of an image displayed by the respective one of the plurality of subpixels 110 is level 0. In the second state, the light transmission direction of at least a portion of light transmitted from the back light module 200 are adjusted toward the light transmissive part 112 of the respective one of the plurality of subpixels 110. At least a portion of light emitted from the back light module 200 is transmitted out of the respective one of the plurality of subpixels 110. The respective one of the plurality of subpixels 110 is in bright state. By controlling the light transmission direction of light transmitted from the back light module, the light transmission direction controller 300 can control the first portion of light transmitted through the light transmissive part 112 to adjust the gray scale of image displayed by the respective one of the plurality of subpixels 110. No polarizer is disposed in the display apparatus to control the gray scale of the display apparatus, the light transmittance of the display apparatus may be increased, and the brightness of an image displayed by the display apparatus may be improved.

In each individual one of the plurality of subpixels 110, the light transmission direction of light is controlled by the light transmission direction controller 300. The light blocking part 111 of each individual one of the plurality of subpixels 110 can have a smaller size, which may reduce the area ratio of the light blocking part 111 in each individual one of the plurality of subpixels, increase the aperture ratio of each individual one of the plurality of subpixels, and enhance the brightness of an image displayed by the display apparatus. For example, the display apparatus is a transparent display apparatus, both in the bright state and the dark state, the display apparatus may use the background light to display image showing the background.

In some embodiments, referring to FIG. 1, a spatial rectangular coordinate system is established based on a plane of the back light module 200. An X-axis and a Y-axis are parallel to the plane of the back light module 200. A Z-axis is perpendicular to the plane of the back light module 200. The cross-sectional views of FIG. 2A, FIG. 2B, and FIG. 2C are a view of a plane parallel to the X-Z plane of the spatial rectangular coordinate system.

Figure 2A:
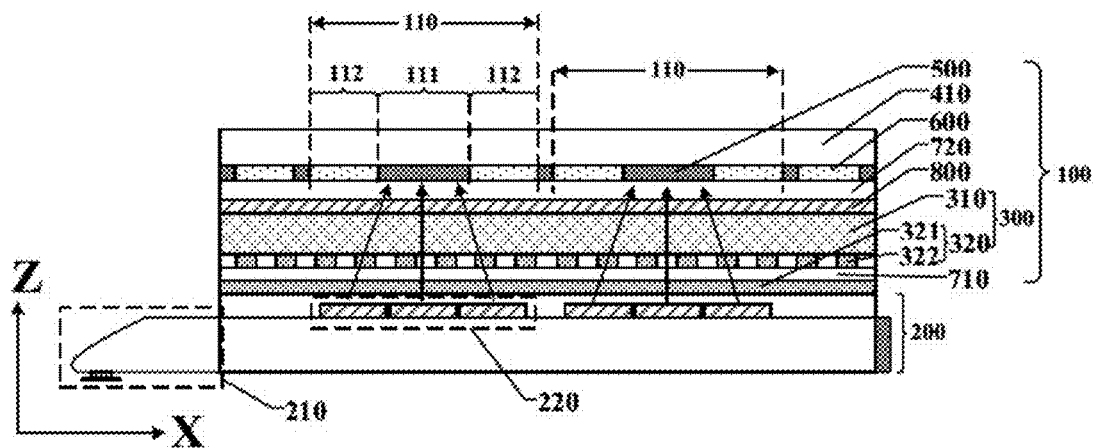
FIG. 2A is a cross-sectional view of a display apparatus under a first state in some embodiments according to the present disclosure.
Figure 2B:
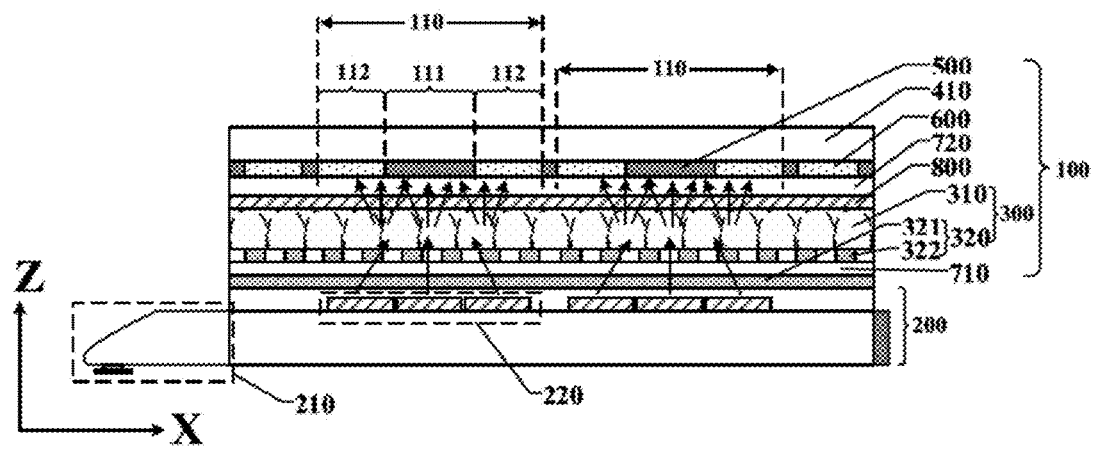
FIG. 2B is a cross-sectional view of a display apparatus under a second state in some embodiments according to the present disclosure.
Figure 2C:
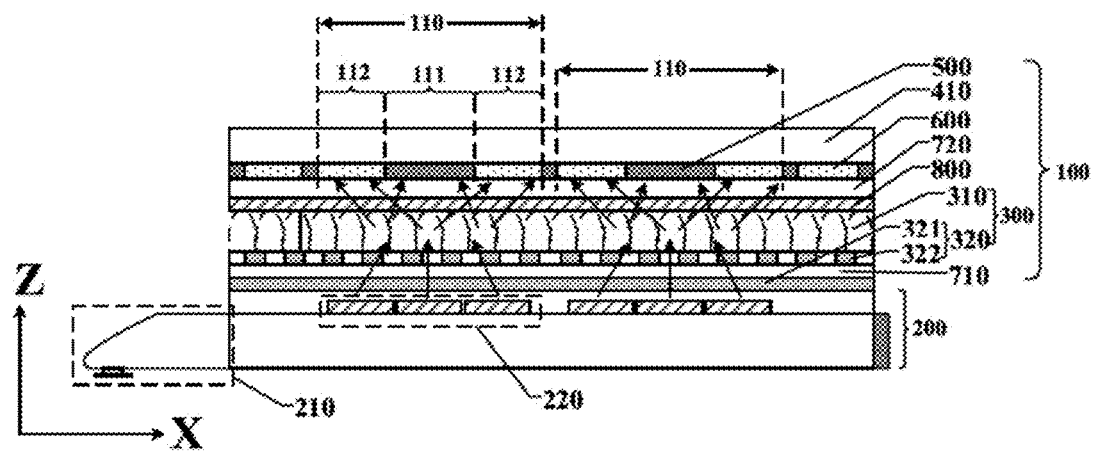
FIG. 2C is a cross-sectional view of a display apparatus under a second state in some embodiments according to the present disclosure.

FIG. 2A is a cross-sectional view of a display apparatus under a first state in some embodiments according to the present disclosure. FIG. 2B is a cross-sectional view of a display apparatus under a second state in some embodiments according to the present disclosure. The second state shown in FIG. 2B is an intermediate bright state. FIG. 2C is a cross-sectional view of a display apparatus under a second state in some embodiments according to the present disclosure. The second state shown in FIG. 2C is a full bright state.

In some embodiments, the light transmission direction controller includes liquid crystal layer and a plurality of liquid crystal control electrodes. Optionally, the plurality of liquid crystal control electrodes are configured to form electric fields on the liquid crystal layer. With the change of the electric fields, the liquid crystal layer can control the light transmission direction of light transmitted through the light transmission direction controller. For example, each individual one of the plurality of liquid crystal control electrodes can induce electric fields. The electric fields can control the torsion and refractive index of the liquid crystal molecules in the liquid crystal layer to control the light transmission direction of light emitted from the back light module. Using the plurality of liquid crystal control electrodes, each individual one of the plurality of subpixels may switch between the first state and the second state.

Referring to both 2A and 2B, the light transmission direction controller 300 includes a liquid crystal layer 310, and a plurality of liquid crystal control electrodes 320. Each individual one of the plurality of liquid crystal control electrode 320 is applied with a voltage to form a respective electric field. States of liquid crystal molecules in the liquid crystal layer 310 can be controlled by the electric fields. For example, the plurality of liquid crystal control electrode 320 can control the liquid crystal molecules to form a liquid crystal grating, liquid crystal lenses, and other structures, to allow the light transmission direction controller 300 to control the light transmittance direction of light emitted from the back light module 200 by refraction or diffraction.

In some embodiments, in each individual one of the subpixels, the light transmission direction controller includes at least a fiber-optic bundle. The fiber-optic bundle includes a plurality of optical fibers. A light scattering degree is controlled by changing a dispersion degree of the plurality of optical fibers. An incident end of the fiber-optic bundle faces the back light module, and an exit end of the fiber-optic bundle faces the light blocking part of a respective one of the plurality of subpixels. The exit end of the fiber-optic bundle is divergent in a natural state. Optionally, the fiber-optic bundle is disposed in a via of a driving structure. The driving structure can control the divergent status of the fiber-optic bundle. In one example, in the first state, the driving structure controls the exit end of the fiber-optic bundle to allow the exit end of the fiber-optic bundle to face the light blocking part of the respective one of the plurality of subpixels. The light transmitted through the fiber-optic bundle is emitted toward the light blocking part of the respective one of the plurality of subpixels. In another example, in the second state, the driving structure decreases or gets rid of force applied on the fiber-optic bundle to allow the exit end of the fiber-optic bundle to stay in a divergent status (e.g. the exit end of the fiber-optic bundle is at or close to a natural state), at least a portion of the exit end of the fiber-optic bundle faces the light transmissive part of the respective one of the plurality of subpixels. The light transmitted through the fiber-optic bundle is emitted toward light transmissive part of the respective one of the plurality of subpixels. By controlling the divergent status of the exit end of the fiber-optic bundle, the gray scale of an image displayed by the respective one of the plurality of subpixels can be controlled.

In some embodiments, the structure of the light transmission direction controller is designed based on the light transmission direction and the distribution of the light emitted from the back light module.

Various types of light may be emitted from the back light module. Examples of types of light emitted from the back light module include, but not limited to, collimated light, and converged light.

In some embodiments, the plurality of liquid crystal control electrodes are configured to be applied with a voltage to form a liquid crystal grating the liquid crystal layer. Based on the light transmission direction of incident light, a pitch of the liquid crystal grating can be adjusted. The light transmission direction controller can control the diffraction angle of the outgoing light, and the light transmission direction controller can control the light transmission direction of the light transmitted through the light transmission direction controller, to control an amount of light transmitted through the light transmissive part of the respective one of the plurality of subpixels, and to control the gray scale of an image displayed by the respective one of the plurality of subpixels. Optionally, subsequent to forming the liquid crystal grating, the diffraction efficiency of the liquid crystal grating can be controlled, and an amount of light diffracted by the liquid crystal grating can also be controlled. The amount of light transmitted through the light transmissive part of the respective one of the plurality of subpixels can be controlled, and the gray scale of an image displayed by the respective one of the plurality of subpixels can also be controlled.

Referring to FIG. 2A, FIG. 2B, and FIG. 2C, each individual one of the plurality of liquid crystal control electrodes 320 of the display apparatus include a first electrode 321 and a second electrode 322. Optionally, in one of the plurality of subpixels, the light emitted from the back light module 200 is converged light in a light transmission direction toward the light blocking part 111. In the first state, no voltage is applied to the first electrode 321 and the second electrode 322 of a respective one of the plurality of subpixels 110. The liquid crystal molecules in the liquid crystal layer 310 allows light to transmit through the liquid crystal layer 310. The light emitted from the back light module 200 has a light transmission direction toward the light blocking part 111 after it is transmitted through the liquid crystal layer 310. In the second state, voltages are applied to the first electrode 321 and the second electrode 322. Electric fields between the first electrode 321 and the second electrode 322 control the liquid crystal molecules to form a liquid crystal grating. The liquid crystal grating may diffract the light emitted from the back light module 200 to guide a portion of the light transmitted toward the light transmissive part 112.

In some embodiments, the first electrode 321 and the second electrode 322 of each individual one of the plurality of subpixels 110 are disposed on a side of the liquid crystal layer 310 facing the back light module 200. Optionally, the first electrode 321 and the second electrode 322 of each individual one of the plurality of subpixels 110 are disposed on a side of the liquid crystal layer 310 away from the back light module 200. Optionally, the first electrode 321 of each individual one of the plurality of subpixels 110 is disposed on a side of the liquid crystal layer 310 facing the back light module 200, and the second electrode 322 of each individual one of the plurality of subpixels 110 is disposed on a side of the liquid crystal layer 310 away from the back light module 200. Optionally, the first electrode 321 of each individual one of the plurality of subpixels 110 is disposed on a side of the liquid crystal layer 310 away from the back light module 200, and the second electrode 322 of each individual one of the plurality of subpixels 110 is disposed on a side of the liquid crystal layer 310 facing the back light module 200.

In some embodiments, the display apparatus includes a first substrate disposed opposite to the back light module 200. Optionally, the light transmission direction controller 300 is disposed between the back light module 200 and the first substrate 410.

In some embodiments, the light emitted from the back light module 200 toward each individual one of the plurality of subpixels 110 is converged light.

In the first state (dark state), the size of the light blocking part 111 of each individual one of the plurality of subpixels 110 can be reduces, and the aperture ratio of each individual one of the plurality of subpixels 110 is increased. In each individual one of the plurality of subpixels 110, an orthographic projection of a light emitting part on the back light module 200 at least partially overlaps with orthographic projections of the light transmissive part 112 and the light blocking part ill on the back light module 200. The area of the light emitting part of the back light module 200 can be increased, an amount of light emitted from the light emitting part of the back light module 200 is also increased, and the brightness of an image displayed by the display apparatus is also enhanced. In one example, in each individual one of the plurality of subpixels 110, the light emitted from the back light module 200 is converged light, the orthographic projection of the light blocking part 111 on the back light module 200 is within the orthographic projection of the light emitting part on the back light module 200.

In the second state, referring to FIG. 2B, the second state is the intermediate bright state. The liquid crystal molecules of the liquid crystal layer 310 forms a liquid crystal grating. The liquid crystal grating diffracts the light emitted from the back light module 200 to control at least a portion of the light to transmit through the light transmissive part 112. Referring to FIG. 2C, the pitch of the liquid crystal grating is adjusted, for example, the pitch is adjusted to a minimum level, and the diffraction angle of light transmitted through the liquid crystal layer reach the maximum level. More light can be transmitted through the light transmissive part 112 of each individual one of the plurality of subpixels 110.

In some embodiments, in each individual one of the subpixels 110, light emitted from the back light module 200 can be collimated light. In some embodiments, in each individual one of the plurality of the subpixels 110, the light emitting part of the back light module 200 corresponds to the light blocking part 111.

In the first state, the light emitted from the back light module 200 is transmitted toward the light blocking part 111, and the respective one of the plurality of the subpixels 110 shows the dark state. Optionally, each individual one of the plurality of the subpixel 110 is in the dark state, the display apparatus is in the dark state.

In the second state, electric fields are formed by the plurality of liquid crystal control electrodes 320, and the electric fields form the liquid crystal grating in the liquid crystal layer 310. The liquid crystal grating can diffract and diverge the light emitted from the back light module 200. For example, a portion of the light emitted from the back light module 200 can be transmitted toward the light transmissive part 112 of the respective one of the plurality of the subpixels 110. And the gray scale of the respective one of the plurality of the subpixels 110 can be adjusted. Optionally, the orthographic projection of the light blocking part on the back light module 200 substantially overlaps or within the orthographic projection of the light emitting part on the back light module 200.

As used herein, the term "substantially overlap" refers to two projections (e.g., two orthographic projections) at least 50%, e.g., at least 60%, at least 70%, at least 80%, at least 90%, at least 95%, at least 99%, overlapping with each other.

In some embodiments, the light emitting part of the back light module 200 corresponds to the light blocking part 11l and the light transmissive part 112 in each individual one of the plurality of the subpixels 110.

In the first state, the plurality of liquid crystal control electrodes 320 form the electric fields to transform the liquid crystal layer 310 into the liquid crystal grating. The liquid crystal grating can diffract the light emitted from the back light module 200 and control the light transmission direction of the light toward the light blocking part 111 of the respective one of the plurality of the subpixels 110. The respective one of the plurality of the subpixels 110 shows dark state. Optionally, each individual one of the plurality of the subpixels 110 is in dark state, the display apparatus is in dark state.

In the second state, the light emitted from the back light module 200 can be directly transmitted through the liquid crystal molecules of the liquid crystal layer 310. The light transmission direction of the light emitted from the back light module 200 is not changed. The light emitted from the back light module 200 is directly transmitted toward both the light blocking part 111 and the light transmissive part 112 of the respective one of the plurality of the subpixels 110. The respective one of the plurality of the subpixels 110 shows bright state.

Optionally, during the transformation from the first state to the second state, the liquid crystal grating is controlled to adjust the diffraction angle of the light transmitted through the liquid crystal grating. The amount of light transmitted through the light transmissive part 112 of the respective one of the plurality of the subpixels 110 can be changed, and the gray scale of the respective one of the plurality of the subpixels 110 can be adjusted. Optionally, the orthographic projection of the light blocking part 111 of each individual one of the plurality of the subpixels 110 on the back light module 200 is within the orthographic projection of the light emitting part on the back light module 200. The orthographic projection of the light transmissive part 112 of each individual one of the plurality of the subpixels 110 on the back light module 200 at least partially overlaps with the orthographic projection of the light emitting part on the back light module 200.

Figure 2D:
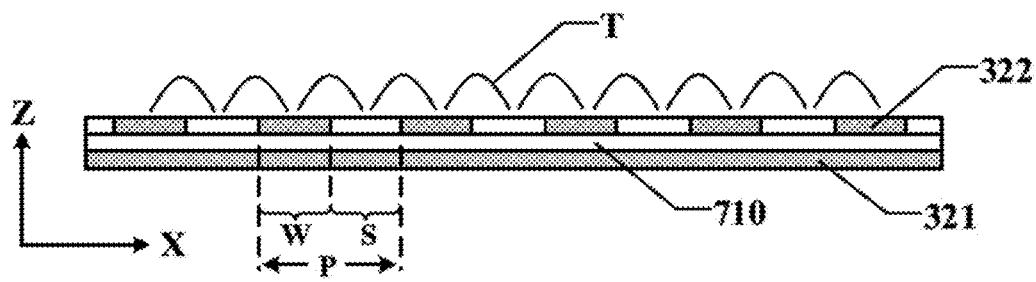
FIG. 2D is a schematic diagram showing a structure of a plurality of liquid crystal control electrodes of a display apparatus in some embodiments according to the present disclosure.

FIG. 2D is a schematic diagram showing a structure of a plurality of liquid crystal control electrodes of a display apparatus in some embodiments according to the present disclosure. There are various ways to arrange the first electrode and the second electrode of each individual one of the plurality of the subpixels.

Referring to FIGS. 2A to 2D, the first electrode 321 and the second electrode 322 of each individual one of the plurality of the subpixels 110 are on a side of the liquid crystal layer 310. Optionally, the first electrode 321 is a common electrode; the second electrode 322 includes a plurality of sub-electrodes, Optionally, the plurality of sub-electrodes are a plurality of electrode strips parallel to each other. For example, voltages are applied to the first electrode 321 and the second electrode 322, a horizontal electric field is formed between the first electrode 321 and the second electrode 322, as the electric field T shown in FIG. 2D. The electric field arrange the liquid crystal molecules in the liquid crystal layer 310 to form the liquid crystal grating.

Referring to 2D, the width of each individual one of the plurality of sub-electrodes of the second electrode 322 is W. The distance between two adjacent sub-electrodes of the plurality of sub-electrodes is S. The pitch P of the second electrode 322 is the pitch between two adjacent sub-electrodes of the plurality of sub-electrodes. A horizontal electric field can be formed between the first electrode 321 and the second electrode 322. Optionally, in each pitch P of the second electrode, two liquid crystal grating strips of the liquid crystal grating are formed, which can improve the diffraction efficiency of the liquid crystal grating and the scattering effect of the liquid crystal grating. For example, the pitch P of the second electrode 322 is no more than 10 μm, e.g. approximately 0 μm to approximately 5 μm, and approximately 5 μm to approximately 10 μm. Various appropriate methods may be used to form a liquid crystal grating. Examples of methods to form a liquid crystal grating include, but not limited to, the method shown in FIG. 2A and FIG. 2B.

Figure 3A:
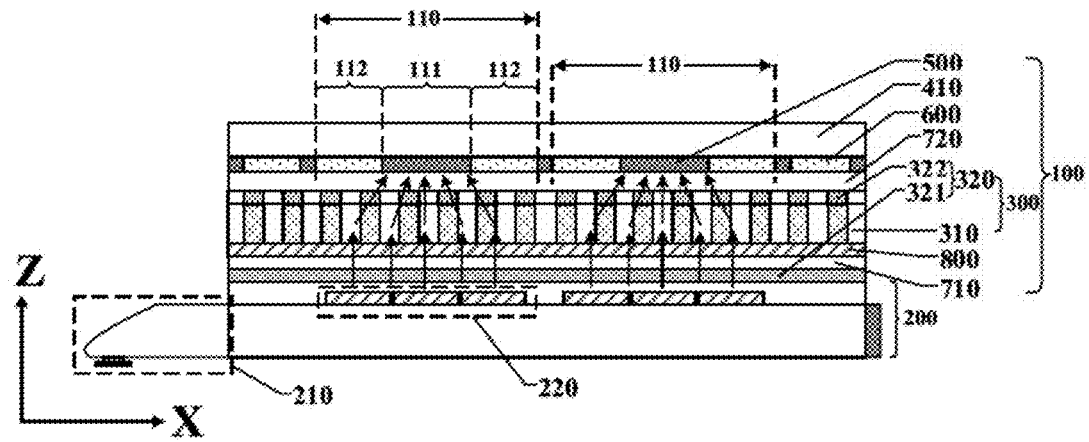
FIG. 3A is a cross-sectional view of a display apparatus under a first state in some embodiments according to the present disclosure.
Figure 3B:
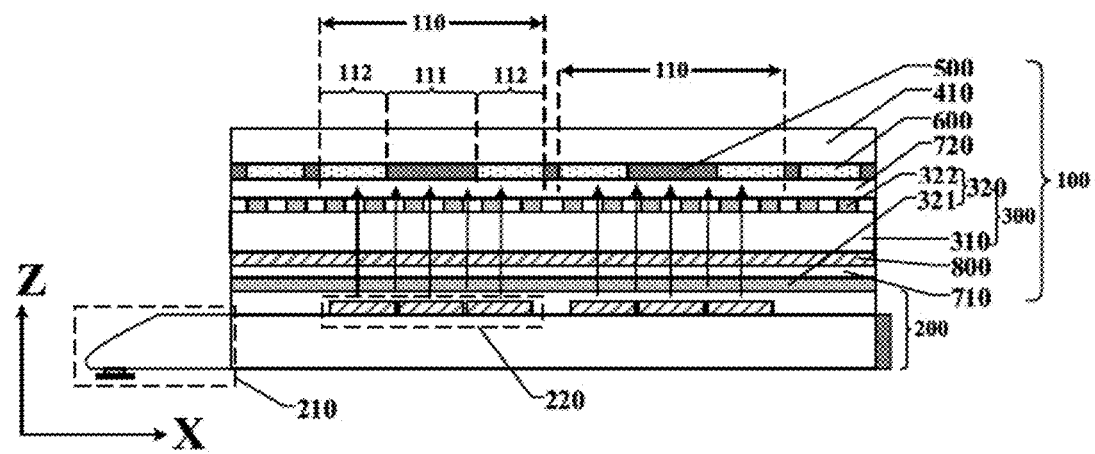
FIG. 3B is a cross-sectional view of a display apparatus under a second state in some embodiments according to the present disclosure.

FIG. 3A is a cross-sectional view of a display apparatus under a first state in some embodiments according to the present disclosure. FIG. 3B is a cross-sectional view of a display apparatus under a second state in some embodiments according to the present disclosure. Referring to FIG. 3A and FIG. 3B, each individual one of the plurality of liquid crystal control electrodes 320 of the light transmission direction controller 300 includes a first electrode 321 and a second electrode 322. Optionally, the first electrode 321 is a common electrode, and the second electrode 322 includes a plurality of sub-electrodes. Optionally, the first electrode 321 is disposed on a side of the liquid crystal layer 310, and the second electrodes 322 is disposed on the other side of the liquid crystal layer 310. In one example, voltages are applied to the first electrode 321 and the second electrode 322 to form an electric field. The electric field controls the liquid crystal molecules of the liquid crystal layer 310 to form a liquid crystal grating on each individual one of the plurality of subpixels 110. In another example, the voltage applied to the second electrode 322 can be adjusted to control the pitch of the liquid crystal grating and to control the different refractive indexes of different area of the liquid crystal grating. The diffraction angle of light transmitted through the liquid crystal grating and the diffraction efficiency of the liquid crystal grating can be controlled, and the gray scale of the respective one of the plurality of subpixels can also be controlled.

Referring to FIG. 3A and FIG. 3B, the light emitted from the back light module 200 is collimated light. A light transmission direction of the light emitted from the back light module 200 is toward both the light blocking part 111 and the light transmissive part 112 in each individual one of the plurality of subpixels 110.

In the first state, referring to FIG. 3A, the liquid crystal molecules of the liquid crystal layer 310 are controlled to form a liquid crystal grating, the liquid crystal grating can control the light diffraction angle of light emitted from the back light module 200. The light transmission direction of the light emitted from the back light module 200 can be controlled toward the light blocking part 111 of the respective one of the plurality of subpixels 110 to perform dark state.

In the second state, referring to FIG. 3B, optionally, in a full bright state of the second state, the liquid crystal molecules in the liquid crystal layer 310 do not change the light transmission direction of the light emitted from the back light module 200, and a portion of the light emitted from the back light module 200 transmits through the light transmissive part 112 of the respective one of the plurality of subpixels 110. Optionally, in an intermediate bright state of the second state, the liquid crystal molecules of the liquid crystal layer 310 are controlled to form a liquid crystal grating, by adjusting the pitch of the liquid crystal grating or diffraction efficiency of the liquid crystal grating, the light transmission direction of a portion of light emitted from the back light module 200 is changed toward the light transmissive part 112 of the respective one of the plurality of subpixels 110. Or the light transmission direction of a portion of light emitted from the back light module 200 is changed not to be transmitted toward the light blocking part 111 of the respective one of the plurality of subpixels 110.

In some embodiments, voltages are applied to the plurality of liquid crystal control electrodes to transform the liquid crystal layer into liquid crystal lenses. The liquid crystal lenses can refract and change the light transmission direction of the light emitted from the back light module. By adjusting voltages applied on the plurality of liquid crystal control electrodes, the refractive index of the liquid crystal lenses and the radius of curvature of the liquid crystal lenses are adjusted to control the direction of a light going out of the liquid crystal lenses. The light transmission direction controller can control the light transmission direction of the light emitted from the back light module.

Figure 4A:
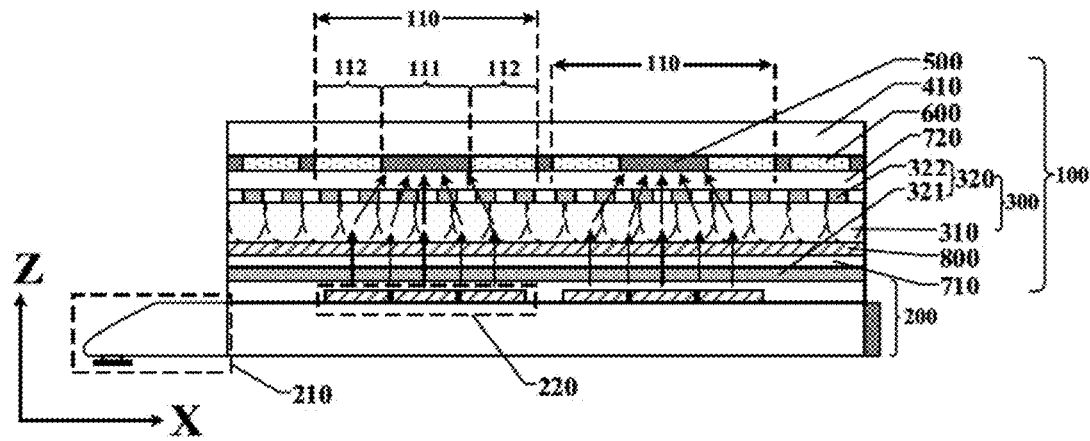
FIG. 4A is a cross-sectional view of a display apparatus under a first state in some embodiments according to the present disclosure.
Figure 4B:
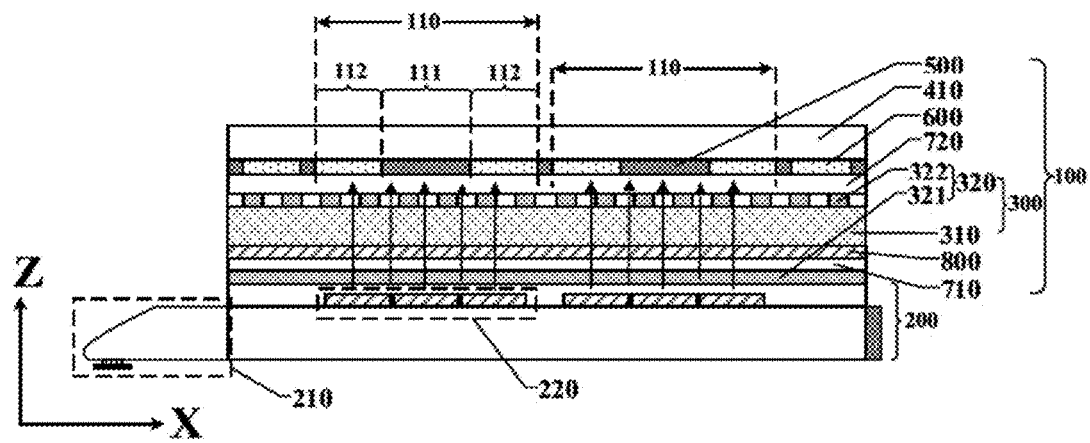
FIG. 4B is a cross-sectional view of a display apparatus under a second state in some embodiments according to the present disclosure.

FIG. 4A is a cross-sectional view of a display apparatus under a first state in some embodiments according to the present disclosure. FIG. 4B is a cross-sectional view of a display apparatus under a second state in some embodiments according to the present disclosure. Referring to both FIG. 4A and FIG. 4B, each individual one of the plurality of liquid crystal control electrodes 320 of the light transmission direction controller 300 includes a first electrode 321 and a second electrode 322. Optionally, the first electrode 321 is a common electrode. Optionally, the second electrode 322 includes a plurality of sub-electrodes. In some embodiments, voltages are applied to the first electrode 321 and the second electrode 322. Optionally, voltages with difference pitches are applied to the second electrode 322 to form an electric field between the first electrode 321 and the second electrode 322 in the respective one of the plurality of subpixels 110. The electric field controls the liquid crystal molecules of the liquid crystal layer 310 to form liquid crystal lenses in the respective one of the plurality of subpixels 110. Optionally, by controlling the voltages applied to the second electrode 322, the refractive index of the liquid crystal lenses the radius of curvature of the liquid crystal lenses, and the locations of the liquid crystal lenses can be adjusted.

Referring to both FIG. 4A and FIG. 4B, in some embodiments, the light emitted from the back light module 200 is collimated light. The light emitting part of the back light module 200 corresponds to both the light blocking part 11/ and the light transmissive part 112 of each individual one of the plurality of subpixels 110.

In the first state, the plurality of liquid crystal control electrodes 320 form an electric field to transform the liquid crystal layer 310 into the liquid crystal lenses. The liquid crystal lenses can diffract and control the light transmission direction of the light emitted from the back light module 200 toward the light blocking part 111 of the respective one of the plurality of the subpixels 110. The respective one of the plurality of the subpixels 110 shows dark state. Optionally, each individual one of the plurality of the subpixels 110 is in dark state, the display apparatus is in dark state.

In the second state, the light emitted from the back light module 200 is directly transmitted through the liquid crystal molecules of the liquid crystal layer 310. The light transmission direction of the light emitted from the back light module 200 is not changed. The light emitted from the back light module 200 is directly transmitted toward both the light blocking part 111 and the light transmissive part 112 of the respective one of the plurality of the subpixels 110. The respective one of the plurality of the subpixels 110 shows bright state.

Optionally, during the transformation from the first state to the second state, the liquid crystal lenses are controlled to adjust the refraction angle of the light transmitted out of the liquid crystal lenses. The amount of light transmitted through the light transmissive part 112 of the respective one of the plurality of the subpixels 110 can be changed, and the gray scale of the respective one of the plurality of the subpixels 110 can be adjusted.

In some embodiments, the light emitted from the back light module 200 is converged light. The light emitted from the light emitting part of the back light module 200 is toward the light blocking part 111 of each individual one of the plurality of subpixels 110.

In the first state, the light emitted from the back light module 200 is toward the light blocking part 111 of a respective one of the plurality of subpixels. The respective one of the plurality of the subpixels 110 shows dark state. Optionally, each individual one of the plurality of the subpixels 110 is in dark state, the display apparatus is in dark state.

In the second state, the plurality of liquid crystal control electrodes form an electric field to transform the liquid crystal layer 310 into liquid crystal lenses. Center positions of the liquid crystal lenses corresponds to the light transmissive part 112 of the respective one of the plurality of subpixels 110. The light emitted from the back light module 200 is converged toward the light transmissive part of the respective one of the plurality of subpixels 110 by the liquid crystal lenses.

In some embodiments, the light transmission direction controller further includes a plurality of grayscale gratings respectively corresponding to the plurality of subpixels. Optionally, the plurality of grayscale gratings are disposed in the liquid crystal layer. For example, the plurality of grayscale gratings are immersed into the liquid crystal layer. Optionally, the plurality of liquid crystal control electrodes are configured to independently adjust an equivalent refractive index of the liquid crystal layer in each individual one of the plurality of subpixels, thereby independently adjusting a difference between the equivalent refractive index of the liquid crystal layer and a refractive index of a respective one of the plurality of grayscale gratings in each individual one of the plurality of subpixels. Due to the difference of refractive indexes between each individual local region of the liquid crystal layer and a respective one of the plurality of grayscale gratings, each individual one of the plurality of grayscale gratings is capable of diffracting light. In one example, under the adjustment of the plurality of liquid crystal control electrodes, the refractive index of the liquid crystal layer changes, and the difference between the refractive index of the liquid crystal layer and the refractive index of the respective one of the plurality of grayscale gratings also changes. The respective one of the plurality of grayscale gratings can diffract light emitted from the back light module. In another example, as the difference between the refractive index of the liquid crystal layer and the refractive index of the respective one of the plurality of grayscale gratings becomes greater, the refraction efficiency of the respective one of the plurality of grayscale gratings becomes higher. The gray scale of each individual one of the plurality of subpixels can be independently adjusted by change the difference between the refractive index of the liquid crystal layer and the refractive index of the respective one of the plurality of grayscale gratings.

Figure 5A:
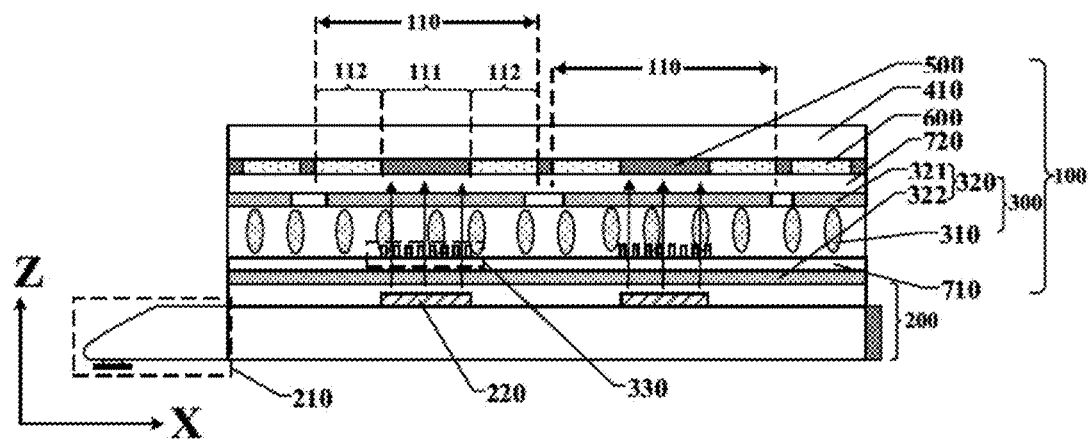
FIG. 5A is a cross-sectional view of a display apparatus under a first state in some embodiments according to the present disclosure.
Figure 5B:
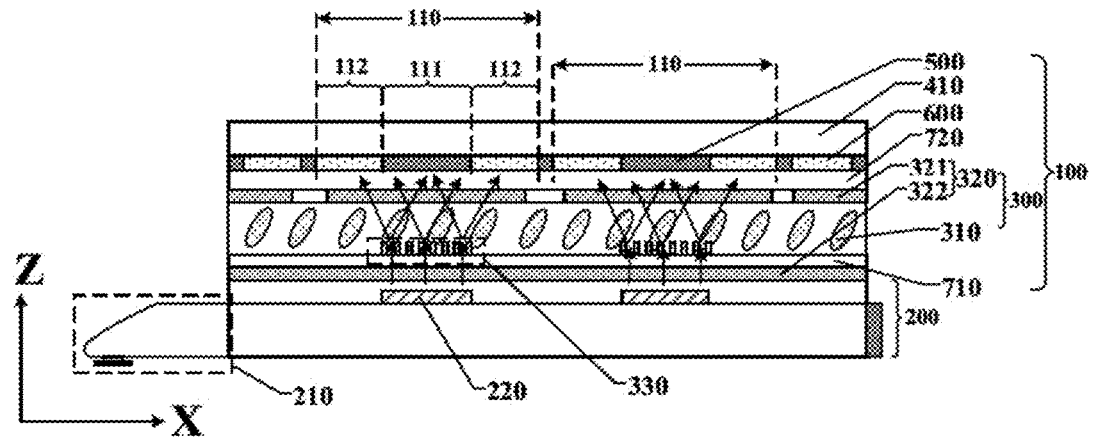
FIG. 5B is a cross-sectional view of a display apparatus under a second state in some embodiments according to the present disclosure.

FIG. 5A is a cross-sectional view of a display apparatus under a first state in some embodiments according to the present disclosure. FIG. 5B is a cross-sectional view of a display apparatus under a second state in some embodiments according to the present disclosure. Referring to FIG. 5A and FIG. 5B, the light transmission direction controller 300 further includes a plurality of grayscale gratings 330. Optionally, the plurality of grayscale gratings 330 is disposed on a side of the liquid crystal layer 310 but at least partially inside the liquid crystal layer 310. Optionally, each individual one of the plurality of grayscale gratings 330 includes a plurality of grating barriers, the two adjacent grating barriers of the plurality of grating barriers are spaced apart from each other. The space between the two grating barriers of the plurality of grating barriers are filled with the liquid crystal material of the liquid crystal layer 310. For example, when there is a difference of refractive indexes between the each individual local region of the liquid crystal layer and a respective one of the plurality of grayscale gratings, there is an optical path difference between each individual local region of the liquid crystal layer and a respective one of the plurality of grayscale gratings. The optical path difference diffracts the light emitted from the back light module.

In some embodiments, the refractive index of a local region of the liquid crystal layer equals to the refractive index of a respective one of the plurality of grayscale gratings. For example, the respective one of the plurality of grayscale gratings does not diffract the light emitted from the back light module. And the light transmission direction of the light emitted from the back light module is not changed by the respective one of the plurality of grayscale gratings and the liquid crystal layer. In some embodiments, voltages are applied to a plurality of liquid crystal control electrodes to form an electric field. The electric field makes the refractive index of a local region of the liquid crystal layer different from (e.g. greater than) the refractive index of a respective one of the plurality of grayscale gratings. For example, the respective one of the plurality of grayscale gratings diffracts the light emitted from the back light module. The light transmission direction of the light emitted from the back light module is changed after the light is transmitted through the respective one of the plurality of grayscale gratings and the liquid crystal layer.

Referring to both FIG. 5A and FIG. 5B, in some embodiments, the light emitted from the back light module 200 is collimated light. Optionally, in each individual one of the plurality of the subpixels 110, the light emitting part of the back light module 200 is disposed in a region corresponding to the light blocking part 111. Optionally, the light emitting part of the back light module 200 substantially overlaps with the light blocking part 111 along a light emitting direction of the collimated light. Specifically, a projection of the light blocking part 111 along a light emitting direction of the collimated light on the first substrate 410 covers a projection of the light emitting part of the back light module 200 along the light emitting direction of the collimated light on the first substrate 410. In one example, an orthographic projection of the light blocking part 111 on the back light module 200 at least partially overlaps with the light emitting part of the back light module 200. In another example, the orthographic projection of the light blocking part 111 on the back light module 200 covers the light emitting part of the back light module 200.

In the first state, referring to FIG. 5A, in a respective one of the plurality of subpixels 110, the refractive index of a local region of the liquid crystal layer 310 equals to the refractive index of a respective one of the plurality of grayscale gratings 330. The light emitting direction of the light emitted from the back light module 200 is not changed, and the light emitted from the back light module 200 is toward the light blocking part 111. The respective one of the plurality of subpixels 110 is in dark state. For example, each of the individual one of the plurality of subpixels 110 is in dark state, the display apparatus is in dark state.

In the second state, referring to FIG. 5B, a voltage is applied to a respective one of the plurality of liquid crystal control electrode 320 to produce an electric field. The electric field makes the refractive index of the respective local region of the liquid crystal layer 310 greater than the refractive index of a respective one of the plurality of grayscale gratings 330. For example, the respective one of the plurality of grayscale gratings 330 can diffract the light emitted from the back light module 200 and change the light transmission direction of the light emitted from the back light module 200 toward the light transmissive part 112 of the respective one of the plurality of subpixels 110. The respective one of the plurality of subpixels 110 is in bright state and can show grey scale images. By controlling the difference between the refractive index of the respective one of the plurality of grayscale gratings 330 and the refractive index of the respective local region of the liquid crystal layer 310, the diffraction efficiency of the respective one of the plurality of grayscale gratings 330 may be controlled, and the gray scale of the respective one of the plurality of subpixels is controlled.

Referring to FIG. 5A and FIG. 5B, in some embodiments, the light emitted from the back light module 200 is converged light. In some embodiments, in each individual one of the plurality of the subpixels 110, the light emitting part of the back light module 200 is disposed in a region corresponding to both the light blocking part 111 and the light transmissive part 112. Optionally, the light emitting part of the back light module 200 and the light transmissive part 112 substantially overlap with the light blocking part 111 along a light emitting direction of the converged light. Specifically, a projection of the light blocking part 111 along a light emitting direction of the converged light on the first substrate 410 covers a projection of the light emitting part of the back light module 200 along the light emitting direction of the converged light on the first substrate 410.

In the first state, in a respective one of the plurality of subpixels 110, the refractive index of a local region of the liquid crystal layer 310 equals to the refractive index of a respective one of the plurality of grayscale gratings 330. The light emitting direction of the light emitted from the back light module 200 is not changed, and the light emitted from the back light module 200 is toward the light blocking part 111. The respective one of the plurality of subpixels 110 is in dark state. For example, each of the individual one of the plurality of the subpixels 110 is in dark state, the display apparatus is in dark state.

In the second state, a voltage is applied to a respective one of the plurality of liquid crystal control electrode 320 to produce an electric field. The electric field makes the refractive index of the respective local region of the liquid crystal layer 310 greater than the refractive index of a respective one of the plurality of grayscale gratings 330. For example, the respective one of the plurality of grayscale gratings 330 can diffract the converged light emitted from the back light module 200 and transmit at least a portion of the converged light toward the light transmissive part 112 of the respective one of the plurality of subpixels 110. The respective one of the plurality of subpixels 110 is in bright state and can show grey scale images.

Figure 6A:
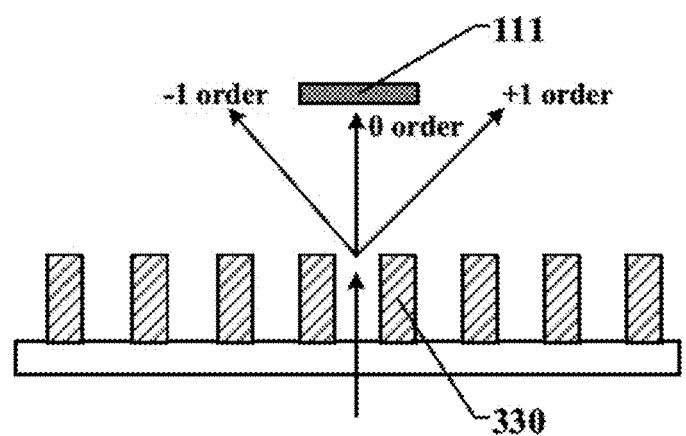
FIG. 6A is a schematic diagram illustrating a working principle of a plurality of grayscale gratings of a display apparatus in some embodiments according to the present disclosure.
Figure 6B:
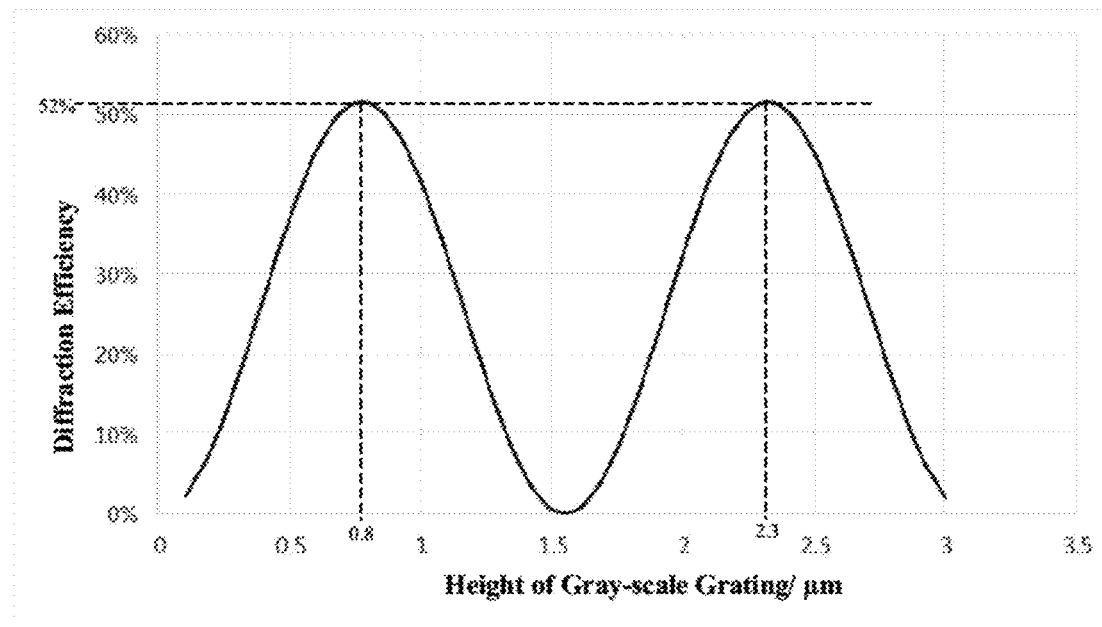
FIG. 6B is a schematic diagram illustrating a relationship between a diffraction efficiency of a plurality of grayscale gratings and a height of the plurality of grayscale gratings in a display apparatus in some embodiments according to the present disclosure.

A diffraction efficiency of one of the plurality of grayscale gratings is relevant to the structural parameters of the respective one of the plurality of grayscale gratings. FIG. 6A is a schematic diagram illustrating a working principle of a plurality of grayscale gratings of a display apparatus in some embodiments according to the present disclosure. FIG. 6B is a schematic diagram illustrating a relationship between a diffraction efficiency of a plurality of grayscale gratings and a height of the plurality of grayscale gratings in a display apparatus in some embodiments according to the present disclosure.

Various appropriate orders of diffraction can be chosen for the plurality of grayscale gratings. For example, the diffraction order of the plurality of grayscale gratings may be ±1. The diffraction efficiency of the plurality of grayscale gratings reaches maximum value, when the diffraction order of the plurality of grayscale gratings is ±1. A utility rate of light emitted from the back light module may be enhanced, and the brightness of an image displayed by the display apparatus with ±1 diffraction order of the plurality of grayscale gratings may also be enhanced. As used herein, the term "diffraction efficiency" refers to the fraction or percentage of incident light that is diffracted by the plurality of grayscale gratings. For example, the diffraction efficiency of the grayscale grating is, after the light transmitting through the plurality of grayscale gratings, a ratio of the amount of light deviated from the original light transmission direction to a total amount of light transmitted to the plurality of grayscale gratings.

Various appropriate diffraction angles may be chosen for the plurality of grayscale gratings. For example, a diffraction angle of the plurality of grayscale gratings is in a range of approximately 10° to approximately 60°, e.g. approximately 10° to approximate 20°, approximately 20° to approximate 30°, approximately 30° to approximate 40, approximately 40° to approximate 50°, and approximately 50° to approximate 60. In one example, the diffraction angle of the plurality of grayscale gratings is approximate 20°. In another example, the diffraction angle of the plurality of grayscale gratings is approximate 30°. In another example, the diffraction angle of the plurality of grayscale gratings is approximate 40°. In another example, the diffraction angle of the plurality of grayscale gratings is approximate 50°.

Various appropriate materials may be used for making the plurality of grayscale gratings. Optionally, a refractive index of the plurality of grayscale gratings is in a range of approximately 1.48 to approximately 1.58, e.g. approximately 1.48 to approximately 1.50, approximately 1.50 to approximately 1.52, approximately 1.52 to approximately 1.54, and approximately 1.54 to approximately 1.56, approximately 1.56 to approximately 1.58. Optionally, a duty ratio of the plurality of grayscale gratings is in a range of approximately 30% to approximately 70%, e.g. approximately 30% to approximately 40%, approximately 40% to approximately 50%, approximately 50% to approximately 60%, and approximately 60% to approximately 70%. Optionally, a pitch of the plurality of grayscale gratings is determined by a wavelength rang of a respective incident light.

Various appropriate materials may be used for making the liquid crystal layer. In some embodiments, a short-axis refractive index of a liquid crystal material (liquid crystal molecules) of the liquid crystal layer is in a range of approximately 1.48 to approximately 1.58, e.g. approximately 1.48 to approximately 1.50, approximately 1.50 to approximately 1.52, approximately 1.52 to approximately 1.54, approximately 1.54 to approximately 1.56, and approximately 1.56 to approximately 1.58. A long-axis refractive index of a liquid crystal material (liquid crystal molecules) of the liquid crystal layer is in a range of approximately 1.6 to approximately 1.9, e.g. approximately 1.6 to approximately 1.7, approximately 1.7 to approximately 1.8, and approximately 1.8 to approximately 1.9. For example, the liquid crystal layer may include the liquid crystal material (liquid crystal molecules) having the short-axis refractive index within the range of approximately 1.48 to approximately 1.58 and the long-axis refractive index within the range of approximately 1.6 to approximately 1.9. For example, the greater the difference between the short-axis refractive index of the liquid crystal material (liquid crystal molecules) and the long-axis refractive index of the liquid crystal material (liquid crystal molecules) is, the wider the adjustable range of the diffraction efficiency of the plurality of grayscale gratings is, and the greater the diffraction order of the plurality of grayscale gratings can be chosen.

Various appropriate thicknesses may be chosen for making the plurality of grayscale gratings. In some embodiments, a wavelength of an incident light is approximately 532 nm, the short-axis refractive index of the liquid crystal material (liquid crystal molecules) is 1.52, the long-axis refractive index of the liquid crystal material (liquid crystal molecules) is 1.82, the refractive index of the plurality of grayscale gratings is 1.52 nm, the pitch of the plurality of grayscale gratings is 600 nm, and the duty ratio of the plurality of grayscale gratings is 50%. Referring to FIG. 6B, the diffraction efficiency periodically changes with the thickness of the plurality of the grayscale gratings. In one example, the thickness of the plurality of the grayscale gratings is 0.8 μm, the diffraction efficiency of the plurality of grayscale gratings reaches maximum value 52%. In another example, the thickness of the plurality of the grayscale gratings is 2.5 μm, the diffraction efficiency of the plurality of grayscale gratings reaches maximum value 52%. For example, the thickness of the plurality of the grayscale gratings is 0.8 μm, the brightness of an image displayed by the display apparatus having the plurality of the grayscale gratings thereof may reaches a maximum value, while the display apparatus may be kept in a small thickness, and the fabricating cost of the display apparatus may be kept in a low cost.

Figure 6C:
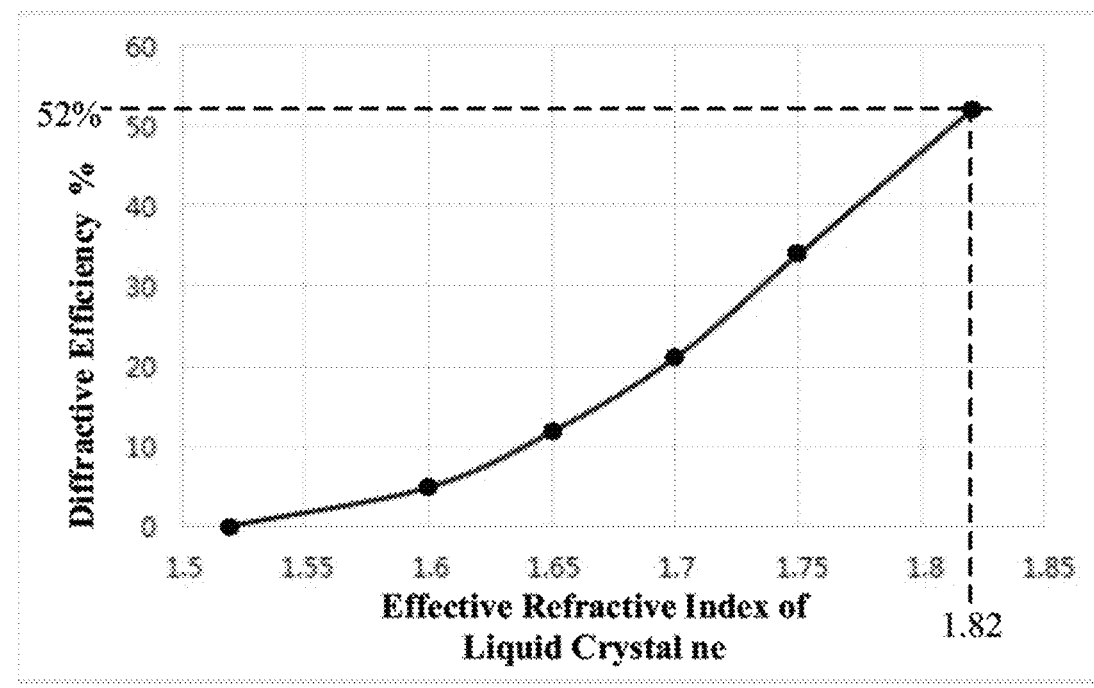
FIG. 6C is a schematic diagram illustrating a relationship between a diffraction efficiency of a plurality of grayscale gratings and an equivalent refractive index of a liquid crystal layer in a display apparatus in some embodiments according to the present disclosure.

FIG. 6C is a schematic diagram illustrating a relationship between a diffraction efficiency of a plurality of grayscale gratings and an equivalent refractive index of a liquid crystal layer in a display apparatus in some embodiments according to the present disclosure. Referring to FIG. 6C, as an equivalent refractive index of a liquid crystal layer increases, a diffraction efficiency of a plurality of grayscale gratings gradually increases. For example, a respective one of the plurality of liquid crystal control electrodes may individually control an equivalent refractive index of a respective local region of the liquid crystal layer, to control the efficiency of a respective one of the plurality of grayscale gratings, and to further control the gray scale of a respective one of the plurality of subpixels.

The diffraction efficiency of the plurality of grayscale gratings is limited by the difference between the short-axis refractive index (minimum diffraction efficiency) of the liquid crystal material (liquid crystal molecules) and the long-axis refractive index (maximum diffraction efficiency) of the liquid crystal material (liquid crystal molecules). Optionally, the liquid crystal material with a greater difference between the short-axis refractive index and the long-axis refractive index the liquid crystal material (liquid crystal molecules) may be chosen to increase the diffraction efficiency of the plurality of grayscale gratings.

In some embodiments, in each individual one of the plurality of subpixels, one of the plurality of grayscale gratings can correspond to both a light blocking part and a light transmissive part.

In the first state, one of the plurality of liquid crystal control electrodes controls a respective local region of the liquid crystal layer to allow a respective one of the plurality of grayscale gratings to diffract light toward the light blocking part. The respective one of the plurality of subpixels is in dark state. Optionally, each individual one of the plurality of subpixels is in dark state, the display apparatus is in dark state.

In the second state, the equivalent refractive index of the respective local region of the liquid crystal layer equals to the refractive index of the respective one of the plurality of grayscale gratings, the light transmission direction of light emitted from the back light module is not be changed, and a portion of the light emitted from the back light module transmits through the light transmissive part, the respective one of the plurality of subpixels is in bright state.

Figure 7:
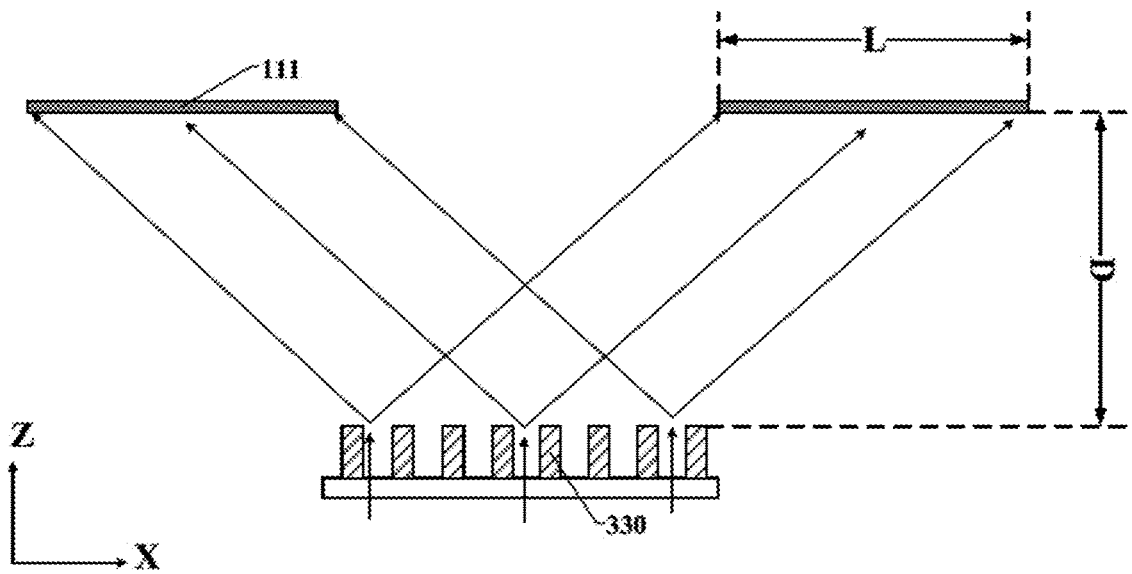
FIG. 7 is a schematic diagram showing a partial structure of a display apparatus in some embodiments according to the present disclosure.

FIG. 7 is a schematic diagram showing a partial structure of a display apparatus in some embodiments according to the present disclosure. Referring to FIG. 7, in a first state, the equivalent refractive index of a local region of the liquid crystal layer reaches the maximum value, and the diffraction efficiency of the respective one of the plurality of grayscale gratings also reaches the maximum value. The light transmission direction of light transmitted through the respective one of the plurality of grayscale gratings can be controlled toward the light blocking part of a respective one of the plurality of subpixels by controlling a distance between the respective one of the plurality of grayscale gratings and the light blocking part of the respective one of the plurality of subpixels, and by controlling the sizes of the respective one of the plurality of grayscale gratings and the light blocking part of the respective one of the plurality of subpixels.

Referring to FIG. 7, in some embodiments, the light emitted from the back light module is collimated light. In one of the plurality of the subpixels, the light blocking part 111 and a respective one of the plurality of grayscale gratings 330 have the same size. In one example, the length L of the light blocking part 111 is a length along a direction of X-axis of the X-Z plane of the spatial rectangular coordinate system. The distance D between the light blocking part 111 and the respective one of the plurality of grayscale gratings 330 is a distance along a direction of z-axis of the X-Z plane of the spatial rectangular coordinate system. The ratio of length L to the distance D is a tangent value of the diffraction angle of the respective one of the plurality of grayscale gratings 330.

In some embodiments, the plurality of grayscale gratings 330 can cooperate with liquid crystal gratings or liquid crystal lenses to control the light transmission direction of the light emitted from the back light module. In one example, in one of the plurality of subpixels, the light transmission direction of the light emitted from the back light module is toward the light blocking part 111.

In the first state, the respective local region of the liquid crystal layer and the respective one of the plurality of grayscale gratings 330 have the same refractive index, the light transmission direction controller will not change the light transmission direction of the light emitted from the back light module.

In the second state, liquid crystal gratings or liquid crystal lenses are formed by the liquid crystal material of the liquid crystal layer. The respective one of the plurality of grayscale gratings 330 diffract the light emitted from the back light module. Subsequently, the liquid crystal gratings or the liquid crystal lenses diffract or refract the light diffracted by the respective one of the plurality of grayscale gratings 330. Specifically, the respective one of grayscale gratings 330 cooperates with liquid crystal gratings or liquid crystal lenses to control the light transmission direction of the light emitted from the back light module toward light transmissive part.

Various appropriate materials may be used for making the plurality of grayscale gratings 330. Examples of materials suitable for making the plurality of grayscale gratings 330 include, but not limited to, inorganic materials with a low refractive index, organic materials with a low refractive index. Optionally, the inorganic materials with a low refractive index include silicon oxide. Optionally, the organic materials with a low refractive index include polyimide.

Various appropriate types of liquid crystal materials may be used for making the liquid crystal layer. Examples of liquid crystal materials suitable for making the liquid crystal layer include, but not limited to, nematic liquid crystal. Optionally, the thickness of the liquid crystal layer is in a range of approximately 0.2 µm to approximately 10 µm, e.g. approximately 0.2 µm to approximately 1 µm, approximately 1 µm to approximately 5 µm, approximately 5 µm to approximately 10 µm. Optionally, the liquid crystal layer is thicker than the plurality of grayscale gratings.

Referring to FIG. 2A to FIG. 5B, in some embodiments, the display apparatus further includes an alignment layer 800. Optionally, the alignment layer 800 is disposed on at least a side of the liquid crystal layer 310. Optionally, the alignment layer 800 can per-align the liquid crystal molecules of the liquid crystal layer 310 to arrange the liquid crystal molecules and to improve the performance of the liquid crystal layer 310. In one example, the alignment layer 800 is formed with polyimide (PI), an ability of the alignment layer 800 to align the liquid crystal molecules is obtained by a rubbing process. In another example, the alignment layer 800 is formed with polyoxysilane, the ability of the alignment layer 800 to align the liquid crystal molecules is obtained by a photo-alignment process.

In another aspect, the present disclosure also provides a display panel. In some embodiments, the display apparatus includes a display panel. Optionally, a light transmission direction controller is disposed in the display panel. Optionally, the display panel includes a first substrate opposite to the back light module. Optionally, the light transmission direction controller is disposed between the first substrate and the back light module.

Referring to FIG. 2A to FIG. 5B, in a display panel 100, a first substrate 410 and a back light module 200 are assembled into a cell. A light transmission direction controller 300 is disposed between the first substrate 410 and the back light module 200. Optionally, parts of structures of the light transmission direction controller 300 (e.g. a first electrode 321 of a plurality of liquid crystal control electrodes 320, a second electrode 322 of a plurality of liquid crystal control electrodes 320) can be disposed on a light emitting side of the back light module 200. Optionally, the display panel 100 and the back light module 200 can be an integrated structure, which may enhance the stability of the display apparatus. In one example, the display panel 100 doesn't include a second substrate opposite to the first substrate 410, which may make the display apparatus thinner. In another example, a plurality of circuits such as thin film transistors are formed on the first substrate 410, which may reduce the damage to the structures of the back light module.

In some embodiments, the display panel of a display apparatus include a first substrate, a second substrate, and a light transmission direction controller between the first substrate and the second substrate.

Figure 8:
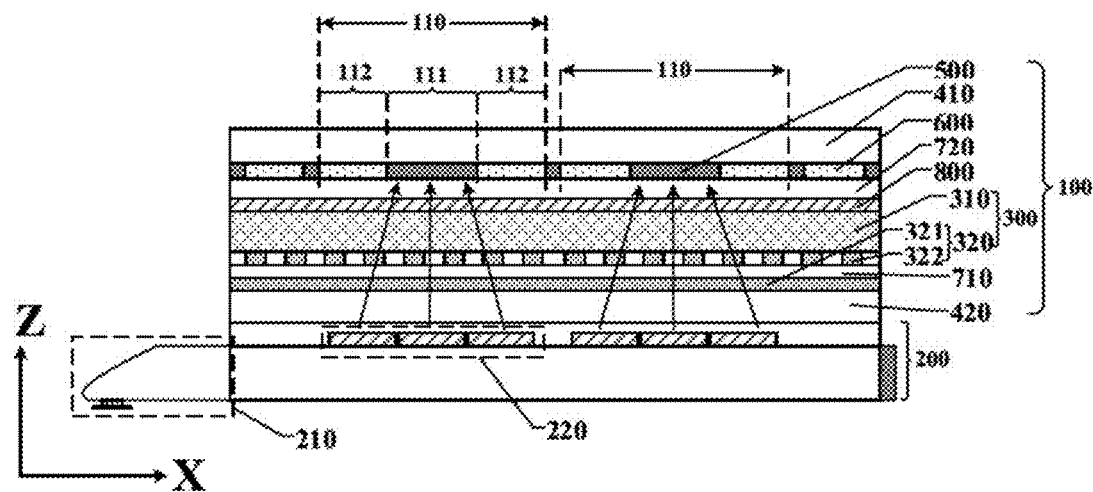
FIG. 8 is a cross-sectional view of a display apparatus in some embodiments according to the present disclosure.

FIG. 8 is a cross-sectional view of a display apparatus in some embodiments according to the present disclosure. Referring to FIG. 8, a display panel 100 includes a first substrate 410, a second substrate 420 opposite to the first substrate 410, and a light transmission direction controller 300 between the first substrate 410 and the second substrate 420. Optionally, the first substrate 410 is a color filter substrate including a plurality of subpixels with colors. The second substrate 420 is an array substrate including driving circuits. In one example, a first electrode 321 and a second electrode 322 of a plurality of liquid crystal control electrodes 320 are disposed on the first substrate 410. In another example, the first electrode 321 and the second electrode 322 of the plurality of liquid crystal control electrodes 320 are disposed on the second substrate 420. In another example, the first electrode 321 and the second electrode 322 of the plurality of liquid crystal control electrodes 320 are respectively disposed on two different substrates selected from the first substrate 410 and the second substrate 420. The fabricating method of the display apparatus becomes simpler, and elements of the display panel 100 will not have negative effect on the back light module 200.

Referring to FIG. 2A to FIG. 5B, the display apparatus includes a display panel, and a back light module. The display panel and the back light module form an integrated structure.

In some embodiments, the back light module includes a light source assembly and a light extraction layer. Optionally, the light extraction layer is disposed on a light emitting side of the light source assembly. Optionally, the light extraction layer is configured to extract the light out of the light source assembly and control the light transmission direction of the light. In one example, the light extraction layer includes a plurality of light extraction gratings. Light emitted from the light source assembly can be diffracted by the plurality of light extraction gratings. A diffraction angle of the light emitted from the back light module can be controlled by changing the parameters of the plurality of light extraction gratings. A light transmission direction of light emitted from the back light module can also be controlled by changing the parameters of the plurality of light extraction gratings.

Various appropriate light source assemblies may be used. Example of suitable light source assemblies include, but not limited to, direct-lit light sources and side-lit light sources. Optionally, the light emitted from the light source can be transmitted through the plurality of light extraction gratings, and the light transmission direction of the light emitted from the light source can be controlled by the plurality of light extraction gratings.

In some embodiments, in a display apparatus, a light source assembly includes a light guide plate and a light source. Optionally, the light guide plate includes a first main surface and a second main surface. The first main surface is opposite to the second main surface. Optionally, the light guide plate further includes a side surface connecting the first main surface and the second main surface. Optionally, the light source is disposed on a side of the light guide plate facing away the side surface. The light source is configured to emit light into the light guide plate. Optionally, a plurality of light extraction gratings are disposed on one of the first main surface and a second main surface. The plurality of light extraction gratings are configured to extract the light emitted from the light source.

Figure 9:
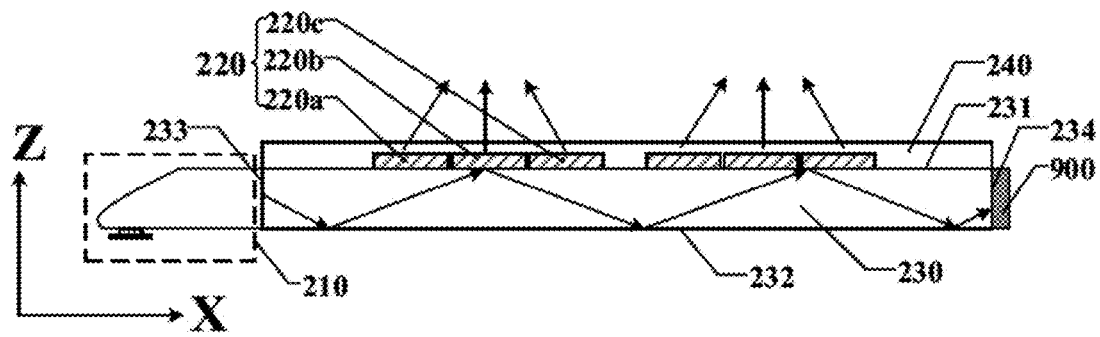
FIG. 9 is a cross-sectional view of a back light module of a display apparatus in some embodiments according to the present disclosure.

FIG. 9 is a cross-sectional view of a back light module of a display apparatus in some embodiments according to the present disclosure. Referring to FIG. 9, in some embodiments, a light source assembly of a back light module 200 includes a light guide plate 230 and a light source 210. A light extraction layer includes a plurality of light extraction gratings 220. The light guide plate 230 includes a first main surface 231 facing a light transmission direction controller 300, a second main surface 232 facing away the light transmission direction controller 300, a first side surface 233 connecting the first main surface 231 and the second main surface 232, and a second side surface 234 connecting the first main surface 231 and the second main surface 232. The first side surface 233 is opposite to the second side surface 234. The first side surface 233 is facing the light source. The second side surface 234 is away from the light source. Optionally, the plurality of light extraction gratings 220 are disposed on the first main surface 231 of the light guide plate 230. For example, the light emitted from the light source 210 is transmitted into the light guide plate 230 via the first side surface 233, subsequently, the light emitted from the light source 210 is transmitted through the light guide plate 230 in a direction along the X-axis of the of the X-Z plane of the spatial rectangular coordinate system, optionally, the plurality of light extraction gratings 220 can guide the light out of the light guide plate 230.

In some embodiments, the light guide plate 230 is substantially parallel to a plane containing a main surface of the back light module 200.

Various appropriate materials may be used for making the plurality of light extraction gratings. Examples of materials suitable for making the plurality of light extraction gratings include, but not limited to, opaque materials, and materials with high refractive index. Optionally, the opaque materials include metals. Optionally, materials with high refractive index include silicon nitride. For example, the refractive index of the plurality of light extraction gratings is in a range of 1.8 to 2.0. And the theoretical refractive index of silicon nitride is approximately 2.0. Optionally, the plurality of light extraction gratings may be formed on the light guide plate using nano-imprint, printing, and lithography patterning process.

In some embodiments, the light source is configured to emit light into light guide plate. Optionally, the light transmission direction of the light emitted from the light source satisfies a condition for total reflection, and the light emitted from the light source can transmit laterally in the light guide plate. Optionally, the light transmitting in the light guide plate is directed out of the light guide plate via the plurality of light extraction gratings.

Referring to FIG. 9, the light emitted from the light source 210 is totally reflected in the light guide plate 230. The plurality of light extraction gratings 220 destroy the condition for total reflection of the light emitted from the light source 210 to allow a portion of the light to transmit out of the light guide plate 230 through the plurality of light extraction gratings 220. Optionally, the regions where the plurality of light extraction gratings 220 are disposed can be changed to control the positions of light emitting parts on the back light module 200, and to avoid the light leakage. Optionally, a small amount of light leakage may be considered acceptable. For example, a small portion of light may transmit out of the light guide plate 230 through the first main surface 231 of the of the light guide plate in regions outside the plurality of light extraction gratings 220.

In some embodiments, the display apparatus is a transparent display apparatus. An incident angle of back ground light on the first main surface 231 of the light guide plate 230 is relatively small, the back ground light can transmit out of the light guide plate 230 through the first main surface 231. An image showing back ground can be displayed by the display apparatus.

In some embodiments, all light transmitted out of the first main surface 231 of the light guide plate 230 will transmits through the plurality of light extraction gratings 220. The first main surface 231 of the light guide plate 230 faces the light transmission direction controller.

Optionally, the plurality of light extraction gratings 220 are configured to control a portion of the light emitted from the light guide plate 230 to transmit in a direction tilting to the first main surface 231. For example, the light emitted from the plurality of light extraction gratings 220 is converged light. At least a portion of the light emitted from the plurality of light extraction gratings 220 is in a direction intersect but not perpendicular to the first main surface 231.

Optionally, the plurality of light extraction gratings 220 are configured to control a portion of the light emitted from the light guide plate 230 in a direction perpendicular to the first main surface 231.

Figure 10A:
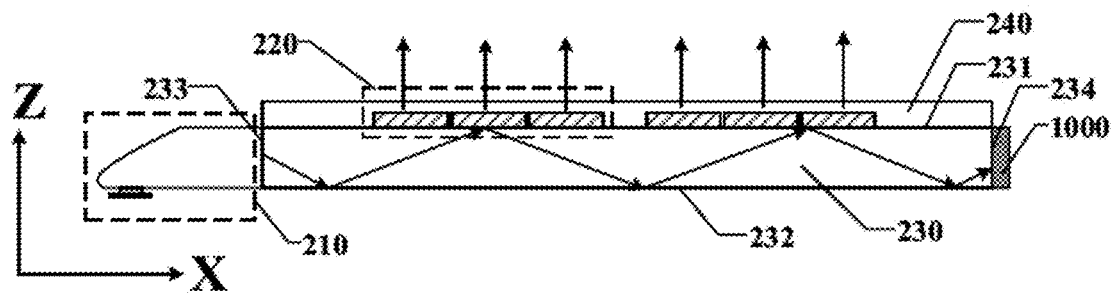
FIG. 10A is a cross-sectional view of a back light module of a display apparatus in some embodiments according to the present disclosure.
Figure 10B:
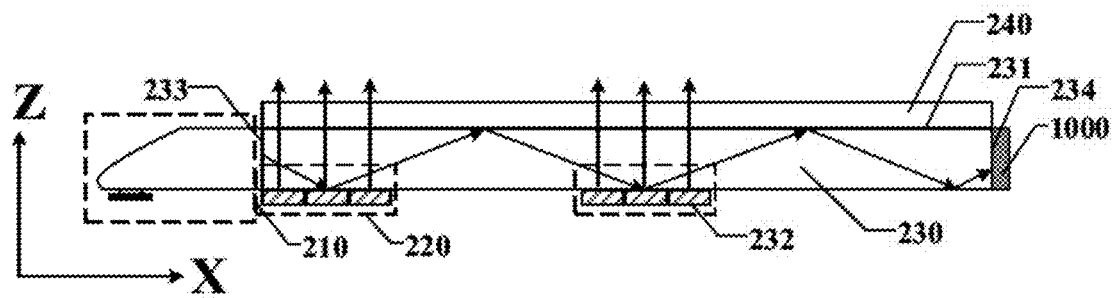
FIG. 10B is a cross-sectional view of a back light module of a display apparatus in some embodiments according to the present disclosure.

FIG. 10A is a cross-sectional view of aback light module of a display apparatus in some embodiments according to the present disclosure. FIG. 10B is a cross-sectional view of a back light module of a display apparatus in some embodiments according to the present disclosure. Referring to both FIG. 10A and FIG. 10B, in some embodiments, light emitted through the plurality of light extraction gratings 220 is collimated light. And the light emitted through the plurality of light extraction gratings 220 is perpendicular to the first main surface 231 of the light guide plate 230.

Optionally, the plurality of light extraction gratings 220 is configured to be a plurality of transmissive-type gratings. The plurality of light extraction gratings 220 is on a side (e.g. the first main surface 231) of the light guide plate 230 facing the light transmission direction controller. Optionally, the plurality of light extraction gratings 220 is configured to be a plurality of reflective-type gratings. The plurality of light extraction gratings 220 is on a side (e.g. the second main surface 232) of the light guide plate 230 away from the light transmission direction controller.

Referring to FIG. 10A, in some embodiments, the plurality of light extraction gratings 220 is a plurality of transmissive-type gratings. The plurality of light extraction gratings 220 is on the first main surface 231 of the light guide plate 230. The plurality of light extraction gratings 220 may allow a portion of light in the light guide plate 230 to transmit through the first main surface 231. The light transmitted through the first main surface 231 is in a direction perpendicular to the first main surface 231.

Referring to FIG. 10B, in some embodiments, the plurality of light extraction gratings 220 is a plurality of reflective-type gratings. The plurality of light extraction gratings 220 is on the second main surface 232 of the light guide plate 230. The plurality of light extraction gratings 220 may reflect a portion of light in the light guide plate 230 to transmit through the first main surface 231. The light transmitted through the first main surface is in a direction perpendicular to the first main surface 231.

In some embodiments, the plurality of light extraction gratings 220 is a plurality of transmissive-type gratings. The plurality of light extraction gratings 220 is on the first main surface 231 of the light guide plate 230. The plurality of transmissive-type gratings include a plurality of grating barriers. The line width of each of the plurality of grating barriers can be measured on the submicron level. After the light is guided to the plurality of grating barriers, the electromagnetic wave of the light changes. The light is diffracted and transmitted though the plurality of transmissive-type gratings. The light emitted from the plurality of transmissive-type gratings has polarization characteristic. The polarization direction of the light emitted from the plurality of transmissive-type gratings is perpendicular to a direction along the length of the plurality of grating barriers. In general, a diffraction angle of the light emitted from the plurality of transmissive-type gratings relates to a pitch of the plurality of transmissive-type gratings, a wavelength of incident light, and an incident angle of the incident light. The following formula shows a relationship between the diffraction angle of the light emitted from the plurality of transmissive-type gratings, the pitch of the plurality of transmissive-type gratings, the wavelength of incident light, and the incident angle of the incident light.

$$n_1 \sin \Theta - n_2 \sin \Theta_0 = m\lambda/c (m=0,\pm1,\pm2,\pm3,\pm4 \ldots)$$

wherein, $n_1$ is the refractive index of the light guide plate; $n_2$ is the refractive index of a dielectric layer (e.g. a filing layer) on a side of the light guide plate; $\Theta$ is an incident angle of light; $\Theta_0$ is a diffraction angle of light, m is an order of diffraction; $\lambda$ is a wavelength of light; and c is pitch of the plurality of transmissive-type gratings.

In some embodiments, the incident angle of light, the refractive index of the light guide plate, and the refractive index of a dielectric layer (e.g. a filing layer) on a side of the light guide plate are fixed, by changing the pitch of the plurality of transmissive-type gratings, the light transmission direction of light transmitted through the plurality of light extraction gratings can be controlled. In one example, the light transmission direction of light transmitted through the plurality of light extraction gratings is perpendicular to the first main surface of the light guide plate. And the collimated light can be emitted from the light guide plate. In another example, the light transmission direction of light transmitted through the plurality of light extraction gratings is tilt to the first main surface of the light guide plate. And the converged light is emitted from the light guide plate.

Figure 11:
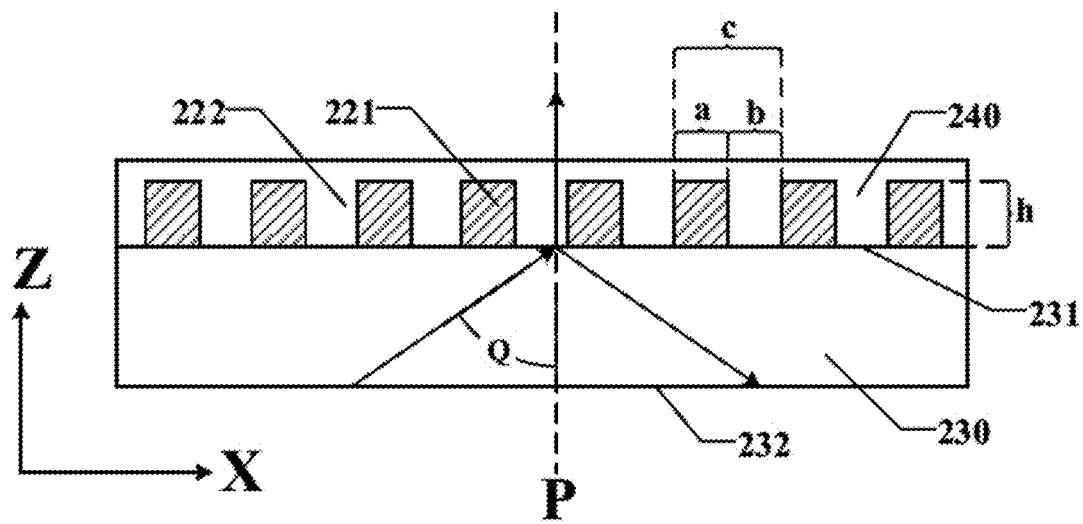
FIG. 11 is a schematic diagram showing a partial structure of a back light module of a display apparatus in some embodiments according to the present disclosure.

FIG. 11 is a schematic diagram showing a partial structure of a back light module of a display apparatus in some embodiments according to the present disclosure. Referring to FIG. 11, a line normal to the first main surface 231 of the light guide plate 230 is denoted as a line P. On the first main surface 231, the incident angle of light is angle Q. Optionally, the plurality of transmissive-type gratings includes a plurality of grating barriers 221 spaced apart by a plurality of slits 222. A line width of each grating bar of the plurality of grating barriers 221 is denoted as a. An inter-barrier distance between two adjacent grating barriers of the plurality of grating barriers 221 is b, which is a width of each of the plurality of slits 222. A pitch of the plurality of transmissive-type gratings is c (c=a+b). In one example, the wavelength of light is 522 nm, the incident angle of light is 65°, the refractive index of the light guide plate 230 is 1.5, the line width a of each grating bar of the plurality of grating barriers 221 is 228.6 nm, the pitch c of the plurality of transmissive-type gratings is 381 nm, the diffraction angle of the light being diffracted is zero. The light transmission direction of the light being diffracted is perpendicular to the first main surface 231 of the light guide plate 230. In another example, wavelength of light is in a range of approximately 515 nm to approximately 535 nm, e.g. approximately 515 nm to approximately 520 nm, approximately 520 nm to approximately 525 nm, approximately 525 am to approximately 530 nm, and approximately 530 nm to approximately 535 nm. The incident angle of light is in a range of approximately 60 to approximately 70°, e.g. approximately 60' to approximately 65°, and approximately 65 to approximately 70°. The light transmission direction of the light being diffracted is substantially perpendicular to the first main surface 231 of the light guide plate 230.

A light extraction rate of diffracted light is correlated to the thickness the plurality of grating barriers 221. For example, the thickness the plurality of grating barriers 221 is 350 m, the light extraction rate of the diffracted light is 20%.

In some embodiments, light emitted from the light source toward the first main surface of the light guide plate has a first direction while reaching the first main surface. Optionally, collimated light is emitted from the light source toward the first main surface of the light guide plate in the first direction, the first direction satisfies the requirement for total reflection. Optionally, an angle between the first direction and the normal line is greater than a critical angle for the total reflection in the light guide plate. All the light emitted from the light source in the first direction can be totally reflected. Optionally, the requirement for total reflection is not satisfied on the positions where the plurality of light extraction gratings are disposed. So the light emitted from the light source in the first direction can be transmitted through the position where the plurality of light extraction gratings are disposed. In some embodiments, the parameters of the plurality of light extraction gratings can be changed to control the light to transmit through the plurality of light extraction gratings.

Referring to FIG. 9 to FIG. 11, in the light guide plate 230, all light has a first direction while it is transmitted to the first main surface 231. Incident angles between the first direction and the normal directions of the plurality of light extraction gratings 220 are the same. The arrangements of the plurality of the light extraction gratings 220 are the same. Adjusting the arrangements of the plurality of the light extraction gratings 220 is performed by adjusting the pitches of the plurality of light extraction gratings 220.

In some embodiments, the plurality of light extraction gratings is a plurality of transmissive-type gratings. The back light module father includes a filing layer covering the plurality of transmissive-type gratings to form a flat surface of the back light module. Optionally, the refractive index of the filing layer is smaller than the refractive index of the light guide plate. For example, the filing layer with a smaller refractive index can make sure that light is totally reflected in the light guide plate. The filing layer performs a surface flattening function to the light guide plate, which is convenient for forming the light transmission direction controller on the light guide plate, and for forming the back light module and the display panel in an integrated structure.

Referring to FIG. 9 to FIG. 11, in some embodiments, a filing layer 240 is disposed on the first main surface 231 of the light guide plate 230. Various appropriate materials may be used for making the filing layer 240. Examples of materials suitable for making the filing layer 240 includes, but not limited to, transparent materials, and translucent materials.

In some embodiments, the refractive index of the filing layer 240 is smaller than the refractive index of the light guide plate 230. On the first main surface 231, the incident angle of the light transmitting in the light guide plate 230 is no less than the critical angle of total reflection of the light guide plate 230 with respective to the filing layer 240. On regions of the first main surface 231 not corresponding to the plurality of light extraction gratings 220, the light transmitting in the light guide plate 230 will have total reflection and will not be transmitted out of the light guide plate 230. Optionally, the filing layer 240 can cover the plurality of light extraction gratings 220, as long as the filing layer 240 will not prevent the light from being transmitted through the plurality of light extraction gratings 220 and subsequently being transmitted out of the light guide plate 230. Optionally, a side of the filing layer 240 away from the light guide plate 230 is level with a side of the plurality of light extraction gratings 220 away from the light guide plate 230, as long as the filing layer 240 do not affect the light emitted through the plurality of light extraction gratings 220.

In some embodiments, the display apparatus is an opaque display apparatus. A reflective layer can be disposed on the second main surface 232 to reflect or totally reflect the light in the light guide plate 230. In some embodiments, the display apparatus is a transparent display apparatus. Referring to FIG. 9 to FIG. 11, optionally, the second main surface 232 of the light guide plate 230 is exposed in the air. Optionally, a material layer with low refractive index can be disposed on the second main surface 232 of the light guide plate 230, a method of disposing the material layer with low refractive index can refer to the method of disposing the filing layer 240 in FIG. 8. In one example, the light transmitting in the light guide plate 230 can be totally reflected on the second main surface 232. And the back light may be transmitted through the back light module 200 to perform transparent display.

Various appropriate thicknesses of the filing layer can be chosen. For example, the thickness of the filing layer is no less than 1 µm.

In some embodiments, along a direction from the first side surface 233 to the second side surface 234, the thicknesses of the plurality of light extraction gratings 220 decrease. As the thicknesses of the plurality of light extraction gratings 220 decrease along a direction from the first side surface 233 to the second side surface 234, the light extraction rates of the light diffracted by the plurality of light extraction gratings 220 increase. For example, the light intensity of the light in the light guide plate 230 decreases along the direction from the first side surface 233 to the second side surface 234, the thicknesses of the plurality of light extraction gratings 220 should decrease along the direction from the first side surface 233 to the second side surface 234, to allow the light extraction rates of the light diffracted by the plurality of light extraction gratings 220 increase along the direction from the light source 210 to the second side surface 234. Each individual one of the plurality of light extraction gratings 220 can emit light with substantially same light intensity, which enhances the uniformity of light emitted from the back light module 200.

Referring to FIG. 9, in some embodiments, the light emitted from the back light module 200 is converged light. Various appropriate methods can be used to arrange the plurality of grating barriers of one of the plurality of light extraction gratings. Optionally, each individual one of the plurality of light extraction gratings include a plurality of regions. Grating barriers in different regions of the plurality of regions have different parameters. Optionally, each individual one of the plurality of light extraction gratings include a plurality of regions. Grating barriers in different regions of the plurality of regions have same parameters.

In some embodiments, in each individual one of the plurality of subpixels, a respective one of the plurality of light extraction gratings sequentially includes a first sub-grating, a second sub-grating, and a third sub-grating. Optionally, the second sub-grating of the respective one of the plurality of light extraction gratings is configured to extract the light transmitted out of the light guide plate in a direction perpendicular to the first main surface of the light guide plate. Optionally, the first sub-grating and the third sub-grating of the respective one of the plurality of light extraction gratings are configured to extract the light transmitted out of the light guide plate in a direction inclined to the first main surface of the light guide plate, converging the light to the direction of the light transmitted by the second sub grating.

In some embodiments, the plurality of light extraction gratings respectively correspond to the plurality of subpixels, the light transmitted through one of the plurality of light extraction gratings will go toward a respective one of the plurality of subpixels, and will not go to other subpixels of the plurality of subpixels. For example, in the direction from the first side surface to the second side surface of the light guide plate, the first sub-grating, the second sub-grating, and the third sub-grating are sequentially disposed on a position of the light guide plate corresponding to a respective one of the plurality of subpixel. Optionally, an average pitch of a plurality of first grating barriers of the first sub-grating is greater than an average pitch of a plurality of second grating barriers of the second sub-grating. The average pitch of the plurality of second grating barriers of the second sub-grating is greater than an average pitch of a plurality of third grating barriers of the third sub-grating.

Referring to FIG. 9, in each individual one of the plurality of subpixels, a respective one of the plurality of light extraction gratings 220 sequentially includes a first sub-grating 220a, a second sub-grating 220b, and a third sub-grating 220c. Optionally, an average pitch of a plurality of first grating barriers of the first sub-grating 220a is greater than an average pitch of a plurality of second grating barriers of the second sub-grating 220b. The average pitch of the plurality of second grating barriers of the second sub-grating 220b is greater than an average pitch of a plurality of third grating barriers of the third sub-grating 220c. Optionally, the light transmitted out of the light guide plate 230 through the first sub-grating 220a and the light transmitted out of the light guide plate 230 through the third sub-grating 220c can converge into the direction of the light transmitted out of the light guide plate 230 through the second sub-grating 220b.

Figure 12:
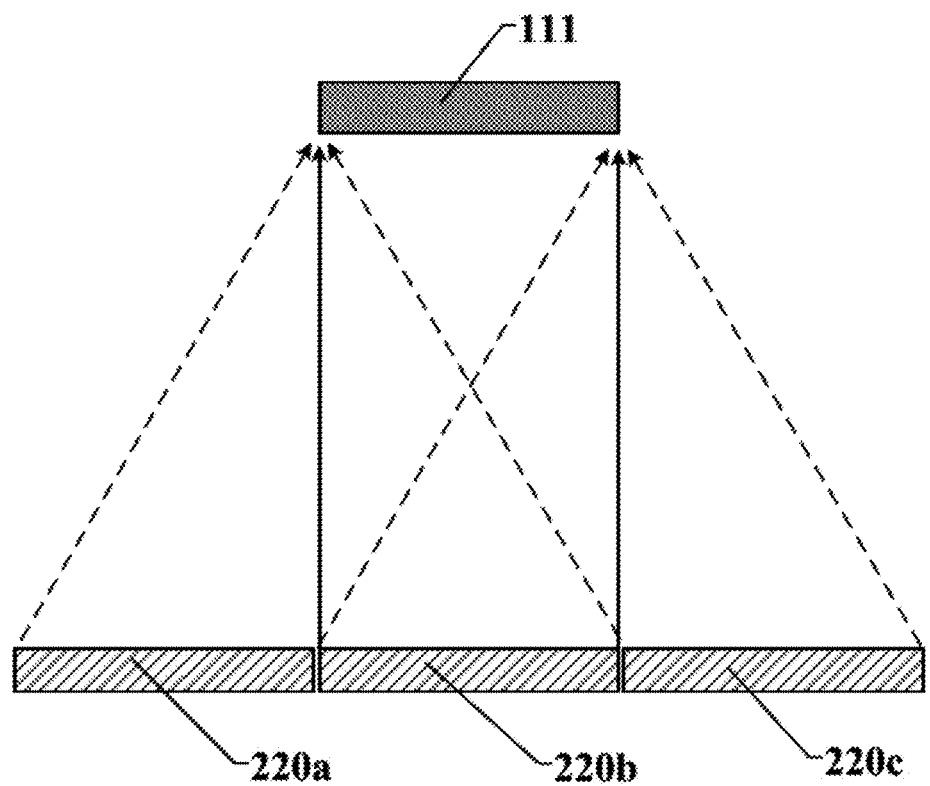
FIG. 12 is a schematic diagram showing a positional relationship between one of the plurality of light extraction gratings and a light blocking part of a display apparatus in some embodiments according to the present disclosure.

FIG. 12 is a schematic diagram showing a positional relationship between one of the plurality of light extraction gratings and a light blocking part of a display apparatus in some embodiments according to the present disclosure. Referring to FIG. 2A, FIG. 2B, FIG. 9 and FIG. 12, in some embodiments, the second sub-grating 220b is configured to extract the light transmitted out of the light guide plate 230 in a direction perpendicular to the first main surface 231 of the light guide plate 230. Optionally, the light transmitted out of the light guide plate 230 through the second sub-grating 220b is toward the light blocking part 111 in a direction perpendicular to the light blocking part 111. A light transmission direction of the light transmitted through the first sub-grating 220a and a light transmission direction of the light transmitted through the third sub-grating 220c are symmetrical with respect to the light transmission direction of the light transmitted through the second sub-grating 220b. Amounts of light transmitted toward the light transmissive parts respectively in the left side and the right side of the light blocking part 11l are the same, which is convenient for independently controlling the gray scale of each individual one of the plurality of subpixels, and for enhancing the display quality of the display apparatus.

In some embodiments, each individual one of the plurality of light extraction gratings include a plurality of sub-gratings (e.g. a first sub-grating, a second sub-grating, and a third sub-grating). Each individual one of the plurality of sub-grating includes a plurality of grating barriers. Optionally, the pitch of one of the plurality of sub-gratings is a fixed value. Optionally, along a direction from the first side surface to the second side surface of the light guide plate, the pitch of one of the plurality of sub-gratings decreases, for example, a pitch of the plurality of grating barriers in one of the plurality of sub-grating decrease, which may further increase the converge level of the light transmitted through the plurality of light extraction gratings, decrease the width of the light blocking parts, increase the aperture ratio of the plurality of subpixels, and enhance the display quality of the display apparatus.

In some embodiments, each individual one of the plurality of light extraction gratings includes a plurality of grating barriers. A pitch of a plurality of grating barriers in a respective one of the plurality of light extraction gratings 220 gradually decreases along the direction of the first side surface to the second side surface of the light guide plate 230.

Figure 13:
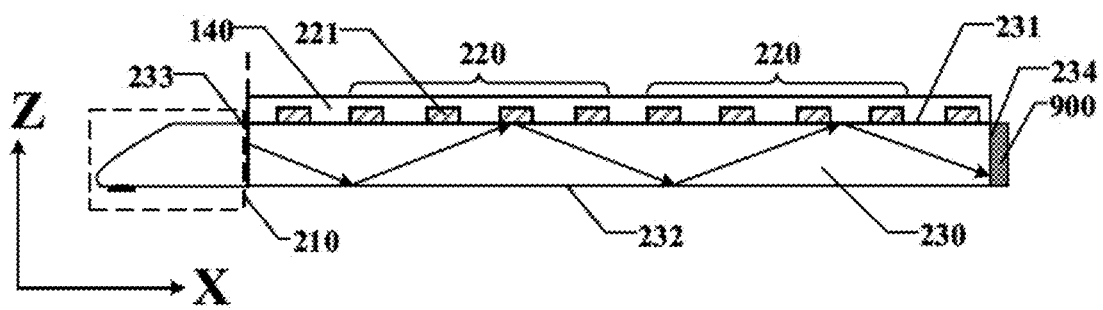
FIG. 13 is a cross-sectional view of a back light module of a display apparatus in some embodiments according to the present disclosure.

FIG. 13 is a cross-sectional view of a back light module of a display apparatus in some embodiments according to the present disclosure. Referring to FIG. 13, the pitch of the plurality of grating barriers in the respective one of the plurality of light extraction gratings 220 gradually decreases along the direction of the first side surface to the second side surface of the light guide plate (e.g., along the direction of x-axis). In one example, the plurality of light extraction gratings 220 along the direction of X-axis have a same average pitch. In another example, values of average pitches of the plurality of light extraction gratings 220 along the direction of X-axis gradually decrease. The converge level of the light transmitted out via the respective one of the plurality of light extraction gratings is increased, the width of the light blocking part is decreased, the aperture ratio of the plurality of subpixels is increased, and the display quality of the display apparatus is enhanced.

In some embodiments, the plurality of light extraction gratings 220 covers the first main surface 231 of the light guide plate 230. In one example, two adjacent light extraction gratings of the plurality of light extraction gratings 220 closely abut. The light extraction rate of the light guide plate 230 is increased, the light utility rate is also increased, and the display quality of the display apparatus is enhanced.

As used herein, the term "abut" means "to meet," and "to be contiguous." "Contiguous" means "close together," "neighboring" or "adjoining." Consequently, to abut means to touch or to adjoin wherein the cut edges are in contact or in proximity. Optionally, the one light extraction grating of the plurality of the light extraction gratings partially overlaps with the other light extraction grating of the plurality of the light extraction gratings at an interface between the one and the other light extraction grating of the plurality of the light extraction gratings. Optionally, the one light extraction grating of the plurality of the light extraction gratings and the other light extraction grating of the plurality of the light extraction gratings are adjacent to each other but not abut to each other or overlapping with each other.

In some embodiments, the light emitted from the back light module is converged light. The back light module further includes a light absorption layer disposed on the second side surface of the light guide plate. The second side surface of the light guide plate is opposite to the first side surface of the light guide plate.

Referring to FIG. 9, in some embodiments, the light guide plate 230 include a second side surface 234. Optionally, the second side surface 234 of the light guide plate 230 is opposite to the first side surface 233 of the light guide plate 230. Optionally, the light absorption layer 900 is disposed on the second side surface 234 of the light guide plate 230. In one example, in the back light module 200, the parameters of the plurality of light extraction gratings 220 is determined. The light transmission direction of the light transmitted out of the light guide plate 230 via the plurality of light extraction grating 220 is also determined. The light transmission direction of the light transmitted toward the plurality of light extraction gratings 220 should be the first direction. Optionally, the light absorption layer 900 can absorb the light transmitting in the light guide plate 230 toward the second side surface 234. No light will be reflected back to the plurality of light extraction gratings 220 by the second side surface 234. All light transmitted toward the plurality of light extraction gratings 220 meets the requirement of the light transmission direction herein.

In some embodiments, the light emitted from the back light module is collimated light. The plurality of grating barriers of each of the plurality of light extraction gratings 220 has a same average pitch. The arrangement of the plurality of grating barriers may refer to the arrangement in FIG. 9. For example, the light transmitted out of the light guide plate via the plurality of light extraction gratings is perpendicular to the first main surface of the light guide plate.

Referring to FIG. 10A, in some embodiments, the back light module 200 further includes a reflective layer 1000. Optionally, the reflective layer 1000 is disposed on the second side surface 234 facing the first side surface 233. In one example, the reflective layer 1000 can prevent the light from emitting out of the second side surface 234. In another example, the light reflected by the reflective layer 1000 can transmit back along a route before the light is reflected by the reflective layer 1000. The light reflected by the reflective layer 1000 can be transmitted out of the light guide plate through the plurality of light extraction gratings 220. The light transmission direction of the light reflected by the reflective layer 1000 and transmitted out of the light guide plate through the plurality of light extraction gratings 220 is perpendicular to the first main surface 231. The reflective layer 1000 can enhance the light utility rate, and reduce energy consumption.

In some embodiments, the light extraction layer is the plurality of light extraction gratings, the light emitted from the light sources into the light guide plate should have a light transmission direction (e.g. the first direction) toward the first main surface.

Figure 14A:
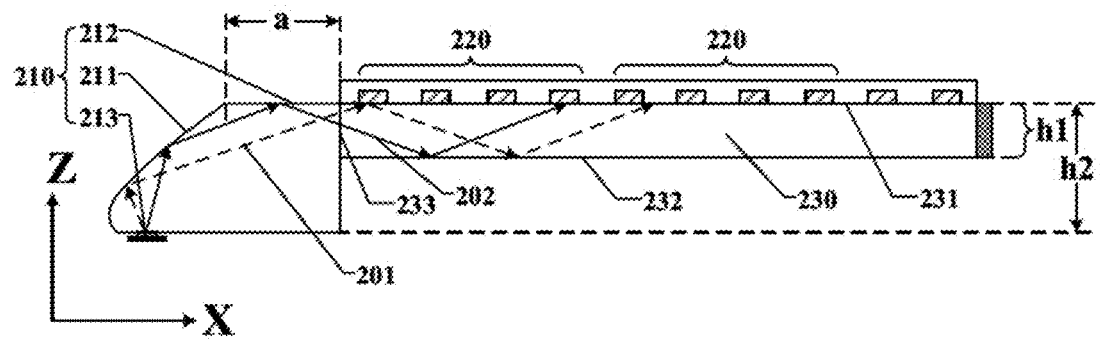
FIG. 14A is a cross-sectional view of a back light module of a display apparatus in some embodiments according to the present disclosure.

FIG. 14A is a cross-sectional view of a back light module of a display apparatus in some embodiments according to the present disclosure. Referring to FIG. 14A, in some embodiments, the light source 210 includes a first reflective mirror 211 and a light illuminant 213. Optionally, the first reflective mirror 211 is configured to reflect the light emitted from the light illuminant 213. Optionally, first reflective mirror 211 is configured to allow the light emitted from the light illuminant 213 to have a light transmission direction approximately equaling to a first direction 201. For example, in the light guide plate, the light transmitted toward the first main surface 231 has the first direction 201. The light emitted out of the light guide plate through the plurality of light extraction gratings 220 can transmit toward the light blocking parts.

In some embodiments, the light illuminant 213 is a Lambertian illuminator (e.g. a cosine radiator), and the first reflective mirror 211 is a part of parabolic or a part of spherical. The light illuminant 213 is at the focus of the first reflective mirror 211. For example, after light emitted from the light illuminant 213 is reflected by the first reflective mirror 211, the light reflected by the first reflective mirror 211 has a light transmission direction. By adjusting the tile level of the first reflective mirror 211, the light transmission direction of the light reflected by the first reflective mirror 211 has a first direction 201. In one example, the first reflective mirror 211 can be rotated in the X-Z plane to allow the light reflected by the first reflective mirror 211 to have a first direction 201.

Optionally, the light emitted from the light illuminant 213 is monochromatic light. The wavelengths of the light emitted from the light illuminant 213 can be the same or approximately the same, which can enhance the converge level of the light emitted through the plurality of light extraction gratings 220. Optionally, the light emitted from the light illuminant 213 is light with a short wavelength. In one example, a color filter having quantum dots can be used. The light with a short wavelength can excite the quantum dots in the color filter to emit light with a specific wavelength, which may perform a color display. In another example, the wavelength of the light emitted from the light illuminant 213 is in a range of approximately 515 nm to 535 nm. A half width of the light emitted from the light illuminant 213 is no more than 40 nm. The size of the light illuminant 213 is in a range of approximately 200 μm×200 μm to approximately 800 μm×800 μm, e.g. approximately 200 μm×200 μm to approximately 300 μm×300 μm, approximately 300 μm×300 μm to approximately 400 μm×400 μm, approximately 400 μm×400 μm to approximately 500 μm×500 μm, approximately 500 μm×500 μm to approximately 600 μm×600 μm, approximately 600 μm×600 μm to approximately 700 μm×700 μm, and approximately 700 μm×700 μm to approximately 800 μm×800 μm.

Various appropriate materials may be used for making the light illuminant 213. Examples of material suitable for making the light illuminant 213 include, but not limited to, Light Emitting Diode (LED), Organic Light Emitting Diode (OLED), and micro LED.

Optionally, the light emitted from the light illuminant 213 usually has a divergence angle. For example, the divergence angle of the LED or OLED is approximately 120°. Optionally, the first reflective mirror 211 should be large enough and thick enough to reflect all the light emitted from the light illuminant 213.

In some embodiments, the back light module further includes a second reflective mirror. The second reflective mirror is on an end of the first reflective mirror away from the light illuminant. Optionally, the first reflective mirror is configured to reflect the light emitted from the light illuminant toward a first direction. Optionally, a portion of light reflected by the first reflective mirror can be reflected by the second reflective mirror and has a second direction.

Referring to FIG. 14A, in some embodiments, the second reflective mirror 212 is on an end of the first reflective mirror 211 away from the light illuminant 213. Optionally, the first reflective mirror 211 is configured to reflect the light emitting from the light illuminant 213 toward a first direction 201. Optionally, a portion of light reflected by the first reflective mirror 211 can be reflected by the second reflective mirror 212 to have a second direction 202. Subsequently, the portion of light reflected by the second reflective mirror 212 is reflected by the second main surface 232 to have a first direction 201. In the light guide plate 230, all the light has a first direction 201 toward the first main surface 231, which makes sure that the light transmitted through the plurality of light extraction gratings 220 may have a light transmission direction toward the light blocking parts.

Optionally, the second reflective mirror 212 can have a flat surface. A plane containing the second reflective mirror 212 is parallel to a plane containing the first main surface 231 of the light guide plate 230. For example, light having the first direction 201 is reflected by the second reflective mirror 212 to have a second direction 202. Subsequently, the light having the second direction 202 is reflected by the second main surface 232 to have the first direction 201.

Optionally, a reflection grating is disposed on at least a portion of the light illuminant. Influenced by the size of the light source and the divergence angle of the light illuminant, light emitted from the light illuminant may directly toward the second reflective mirror. Optionally, the reflection grating can be disposed on a region of the second reflective mirror where light emitted from the light illuminant may be directly transmitted to. The pitch of the reflection grating can be determined based on the incident angle of light to make sure that the light reflected by the reflection gratings has the second direction 202 as shown in FIG. 14A. In the light guide plate, all light transmitted toward the first main surface has the first direction, which may enhance the light utility rate and reduce the energy consumption.

Referring to FIG. 14, optionally, the light source 210 can be inverted based on the X-Y plane. After light emitted from the light source 210 is transmitted to the light guide plate 230, the light transmitted toward first main surface 231 still has the first direction. Optionally, the end of the first reflection mirror 211 away from the light illuminant 213 is in the plane containing the second main surface 232 of the light guide plate 230. Optionally, the second reflective mirror 212 is in the plane containing the second main surface 232 of the light guide plate 230. The thickness of the display apparatus may be decreased.

Figure 14B:
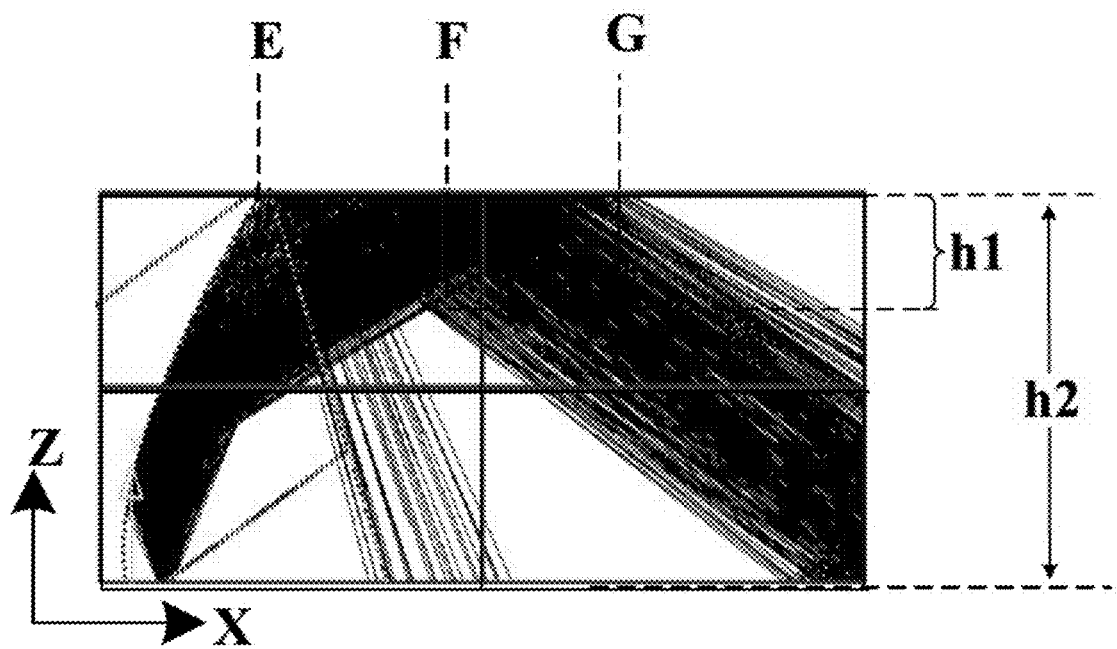
FIG. 14B is a schematic diagram showing light distribution emitted from a light source in FIG. 14 A in some embodiments according to the present disclosure.

FIG. 14B is a schematic diagram showing light distribution emitted from light source in FIG. 14 A in some embodiments according to the present disclosure. The optical path diagram in FIG. 14B is simulated using a software Lighttools based on the structure of the light source. Referring to both FIG. 14A and FIG. 14B, distribution of light in different region of the light source is different, and the light transmission direction of light in different region of the light source is also different. Parameters such as the position of the light guide plate, and the thickness of the light guide plate can be determined based on the light distribution. In one example, Position E corresponds to the end of the first reflective mirror 211 away from the light illuminant 213. The first side surface 233 of the light guide plate 230 is disposed abutting the position E. The second reflective mirror 212 may not be disposed in the light source 210. In another example, the first side surface 233 of the light guide plate 230 is disposed abutting the position F or position G, the second reflective mirror 212 is disposed in the light source 210.

Figure 14C:
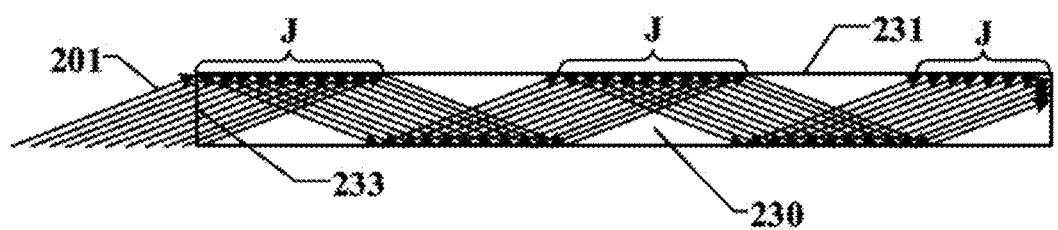
FIG. 14C is a schematic diagram showing light distribution in a light guide plate in some embodiments according to the present disclosure.

FIG. 14C is a schematic diagram showing light distribution in a light guide plate in some embodiments according to the present disclosure. Referring to FIG. 14C, in some embodiment, the first side surface 233 of the light guide plate 230 is disposed abutting the position E of FIG. 14B. Referring to both FIG. 14B and FIG. 14C, the light transmitted toward the first side surface 233 has the first direction 201. Only regions J of the first main surface 231 of the light guide plate 230 can allow the light to transmit out of the light guide plate 230. Optionally, the plurality of light extraction gratings is a plurality of transmissive-type gratings. The plurality of light extraction gratings may be respectively disposed on the regions J. The locations of regions J and the locations of the plurality of light extraction gratings can be adjusted by changing the first direction 201.

In some embodiments, due to the divergence angle of the light illuminant and the structure of the first reflective mirror of the light illuminant, the light emitted from the light illuminant may directly transmit to the first side surface 233 of the light guide plate 230. Optionally, light transmitted through the first side surface 233 of the light guide plate 230 includes light transmitted directly from the light illuminant and light reflected be the first reflective mirror. The light reflected by the first reflective mirror has the first direction, but the light transmitted directly from the light illuminant has a light transmission direction different from the first direction and the second direction, which will affect the light emitted out of the back light module. The ratio of the light transmitted directly from the light illuminant to all light transmitted into the light guide plate is relatively small, and the effect of the light transmitted directly from the light illuminant is within an acceptable range.

Figure 14D:
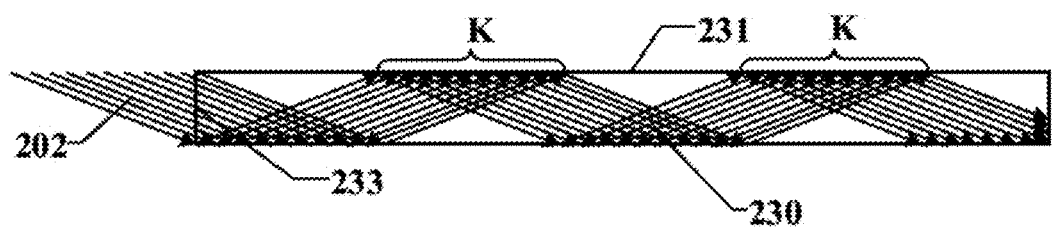
FIG. 14D is a schematic diagram showing light distribution in a light guide plate in some embodiments according to the present disclosure.

FIG. 14D is a schematic diagram showing light distribution in a light guide plate in some embodiments according to the present disclosure. Referring to FIG. 14D, in some embodiment, the first side surface 233 of the light guide plate 230 is disposed abutting the position G of FIG. 14B. Referring to both FIG. 14B and FIG. 14D, the distance between the position E and the position G represents the maximum effective length of the second reflective mirror. Within the effective length of the second reflective mirror, the second reflective mirror can reflect the light emitting from the light illuminant. Optionally, the length of the second reflective mirror is greater than the maximum effective length (e.g. distance between the position E and the position G) of the second reflective mirror. All light transmitted toward the first main surface 231 of the light guide plate 230 has the second direction 202. Optionally, only regions K of the first main surface 231 of the light guide plate 230 can allow the light to transmit out of the light guide plate 230. Optionally, the plurality of light extraction gratings is a plurality of transmissive-type gratings. The plurality of light extraction gratings may be respectively disposed on the regions K. The locations of regions K and the locations of the plurality of light extraction gratings can be adjusted by changing the second direction 202.

Figure 14E:
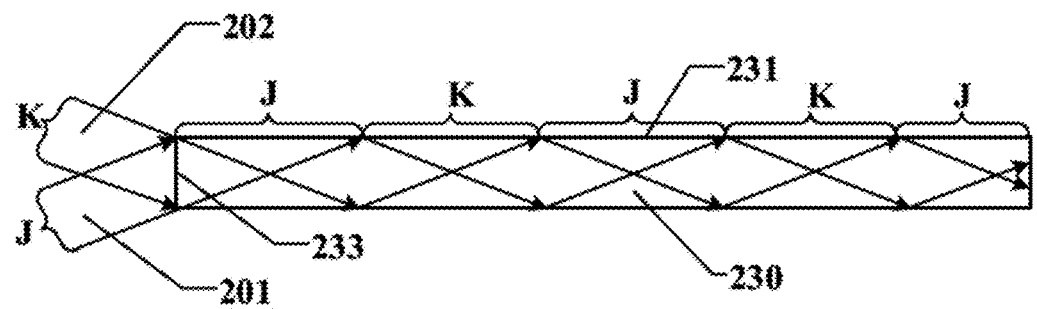
FIG. 14E is a schematic diagram showing light distribution in a light guide plate in some embodiments according to the present disclosure.

FIG. 14E is a schematic diagram showing light distribution in a light guide plate in some embodiments according to the present disclosure. Referring to FIG. 14E, in some embodiment, the first side surface 233 of the light guide plate 230 is disposed abutting a position between the position E and the position G (e.g. position F). Referring to both FIG. 14B and FIG. 14E, light transmitted toward the first side surface 233 of the light guide plate 230 has both the first direction and the second direction. Optionally, the light having the first direction is represented by light J. The light having the second direction is represented by light K. Regions J of the first main surface 231 of the light guide plate 230 can allow the light J to transmit out of the light guide plate 230. Regions K of the first main surface 231 of the light guide plate 230 can allow the light K to transmit out of the light guide plate 230. Optionally, referring to FIG. 14E, the whole surface of the first side surface 233 are respectively covered by light J and light K, the regions J and regions K on the first main surface 231 are complementary to each other. The first side surface 233 is fully covered by the regions J and regions K. Optionally, the plurality of light extraction gratings can be disposed in any region of the first side surface 232 as needed, which may reduce the difficult to design the display apparatus.

Referring to FIG. 14A to FIG. 14E, the distribution of light in the light guide plate also relates to the thickness of the light guide plate, the size of the light source and the position relation between the light guide plate and light source.

In some embodiments, the first side surface 233 of the light guide plate 230 is disposed abutting the position F. The position F is between the position E and the position G. Referring to FIG. 14A, the second reflective mirror 212 is in a plane containing the first main surface 231 of the light guide plate 230. Optionally, a thickness of the light guide plate 230 is h1. A height of the light illuminant 213 is h2. The width of the second reflective mirror 212 along the X-axis direction is a. The following 4 tables (Table 1 to Table 4) analyze the relationship between the height h2 of the light illuminant 213, the thickness h1 of the light guide plate 230, the width a of the second reflective mirror 212, and a portion of light inputted. The portion of light inputted is a ratio of light transmitted into the light guide plate to the light emitted from the light illuminant.

TABLE 1

A relationship between the height h2 of the light illuminant and the maximum value of the portion of light inputted

| Height h2 of the light illuminant (mm) | Thickness h1 of the light guide plate (mm) | Maximum value of the portion of light inputted (%) |
|---|---|---|
| 2 | 0~0.45 | 63 |
| 3 | 0~0.8 | 76 |
| 4 | 0~1.5 | 85 |
| 5 | 0~2.0 | 87 |
| 6 | 0~2.5 | 85 |

The table 1 shows the relationship between the height $h_2$ of the light illuminant and the maximum value of the portion of light inputted. Referring to Table 1, the height $h_2$ of the light illuminant is fixed, but the thickness $h_1$ of the light guide plate is changing. In one example, the height $h_2$ of the light illuminant is 4 mm. The thickness $h_1$ of the light guide plate gradually increases from 0 mm, and the portion of light inputted gradually increases. For example, the thickness $h_1$ of the light guide plate is 1.5 mm, the portion of light inputted reaches 85%. As the thickness $h_1$ of the light guide plate further increases, the portion of light inputted keeps the same, i.e. the maximum value of the portion of light inputted is 85%. In another example, in order to reach a maximum value of the portion of light inputted, height $h_2$ of the light illuminant should increase, and the thickness $h_1$ of the light guide plate should also increases. In another example, if the height $h_2$ of the light illuminant is in a range of 4 mm to 6 mm, the maximum values of the portion of light inputted is in a range of 85-87. Specifically, if the height $h_2$ of the light illuminant is 4 mm, the portion of light inputted reaches a relative high value 85.

TABLE 2

A relationship between the height h2 of the light illuminant and the portion of light inputted

| Height h2 of the light illuminant (mm) | Portion of light inputted (%) when the thickness h1 of the light guide plate is 0.7 mm |
|---|---|
| 2 | 63 |
| 3 | 72 |
| 4 | 61 |
| 5 | 47 |
| 6 | 14 |

Table 2 shows the relationship between the height $h_2$ of the light illuminant and the portion of light inputted. In some embodiments, the thickness $h_1$ of the light guide plate is 0.7 mm. Referring to Table 2, thickness $h_1$ of the light guide plate is fixed, as the height $h_2$ of the light illuminant increases, the portion of light inputted increases but subsequently decreases. In one example, the thickness $h_1$ of the light guide plate is 0.7 mm. As the height $h_2$ of the light illuminant increases from 2 mm to 3 mm, the portion of light inputted increases from 63% to 72%. As the height $h_2$ of the light illuminant increases from 3 mm to 6 mm, the portion of light inputted decreases from 72% to 14%. For example, when the height $h_2$ of the light illuminant is in a range of 4 mm to 6 mm, the portion of light inputted reaches the maximum value.

Referring to both Table 1 and Table 2, in order to have a relatively high value of the portion of light inputted, optionally, the height $h_2$ of the light illuminant is in a range of 2 mm to 6 mm; optionally, the height $h_2$ of the light illuminant is in a range of 2 mm to 4 mm.

TABLE 3

A relationship between the width a of the second reflective mirror along the X-axis direction and the portion of light inputted

| Width a of the second reflective mirror (mm) | Thickness h1 of the light guide plate (mm) | Portion of light inputted (%) |
|---|---|---|
| 1 | 0.7 | 35.5 |
| 1.5 | 0.7 | 49.7 |
| 2 | 0.7 | 66.7 |
| 2.5 | 0.7 | 72 |
| 3 | 0.7 | 69.3 |
| 3.5 | 0.7 | 62.5 |
| 4 | 0.7 | 50.9 |

Table 3 shows the relationship between the width a of the second reflective mirror along the X-axis direction and the portion of light inputted. In some embodiments, the thickness $h_1$ of the light guide plate is 0.7 mm. Referring to Table 3, thickness $h_1$ of the light guide plate is fixed, as the width a of the second reflective mirror increases, the portion of light inputted increases but subsequently decreases. In one example, the thickness $h_1$ of the light guide plate is 0.7 mm. As the width a of the second reflective mirror increases from 1 mm to 2.5 mm, the portion of light inputted increases from 35.5% to 72%. As the width a of the second reflective mirror increases from 2.5 mm to 4 mm, the portion of light inputted decreases from 72% to 50.9%. For example, when width a of the second reflective mirror is in a range of 1 mm to 4 mm, the portion of light inputted reaches the maximum value. In one example, the width a of the second reflective mirror is in a range of 1 mm to 4 mm, e.g. 1 mm to 2 mm, 2 mm to 3 mm, and 3 mm to 4 mm.

TABLE 4

A relationship between the thickness h1 of the light guide plate and tire portion of light inputted

| Width a of the second reflective mirror (mm) | Thickness h1 of the light guide plate (mm) | Portion of light inputted (%) |
|---|---|---|
| 2.5 | 0.3 | 38.7 |
| 2.5 | 0.4 | 49.8 |
| 2.5 | 0.5 | 59 |
| 2.5 | 0.7 | 72 |
| 2.5 | 1.0 | 80.8 |
| 2.5 | 1.2 | 81.7 |
| 2.5 | 1.4 | 81.7 |

Table 4 shows the relationship between the thickness $h_1$ of the light guide plate and the portion of light inputted. In some embodiments, the width a of the second reflective mirror is 2.5 mm. Referring to Table 4, the width a of the second reflective mirror is fixed, as the thickness $h_1$ of the light guide plate gradually increases, the portion of light inputted gradually increases. In one example, the width a of the second reflective mirror is 2.5 mm, as the thickness $h_1$ of the light guide plate increases from 0.3 mm to 1.2 mm, the portion of light inputted increases from 38.7% to 81.7%. As the thickness $h_1$ of the light guide plate further increases, the portion of light inputted keeps at the same value 81.7%. In another example, when the thickness $h_1$ of the light guide plate is greater than 0.7 mm, the value of the portion of light inputted is relatively high. In another example, when the thickness $h_1$ of the light guide plate is greater than 1.2 mm, light may only transmit through partial region of the first side surface, and the light will not cover the whole surface of the first main surface of the light guide plate. Light will only transmit through partial first main surface of the light guide plate. The positions of the plurality of light extraction gratings should be disposed on regions corresponding to the regions where light will transmit through the first main surface of the light guide plate. For example, the thickness h1 of the light guide plate is in a range of 0.1 mm to 1.2 mm, e.g. 0.1 mm to 0.5 mm, 0.5 mm to 1.0 mm, and 1.0 mm to 1.2 mm.

In some embodiments, the light source is configured to emit light toward the light guide plate. The light guide plate is configured to allow the light to have total reflection in the light guide plate.

Various appropriate materials may be used for making the light extraction layer. Examples of materials suitable for making the light extraction layer include, but not limited to, optical film layers, and optical dot structures. Optionally, the optical film layers include prism films, lens films, and light extraction film, as long as the optical film layers can guide the light out of the light guide plate and form collimated light or converged light.

Various appropriate arrangement may be used in arranging the light transmissive part and the light blocking part in each individual one of the plurality of subpixels. Optionally, each individual one of the plurality of subpixels includes a single light transmissive part, and the light blocking part is disposed adjacent to a side of the single light transmissive part. Optionally, each individual one of the plurality of subpixels includes two light transmissive parts, and a light blocking part disposed between the two light transmissive parts.

Figure 15:
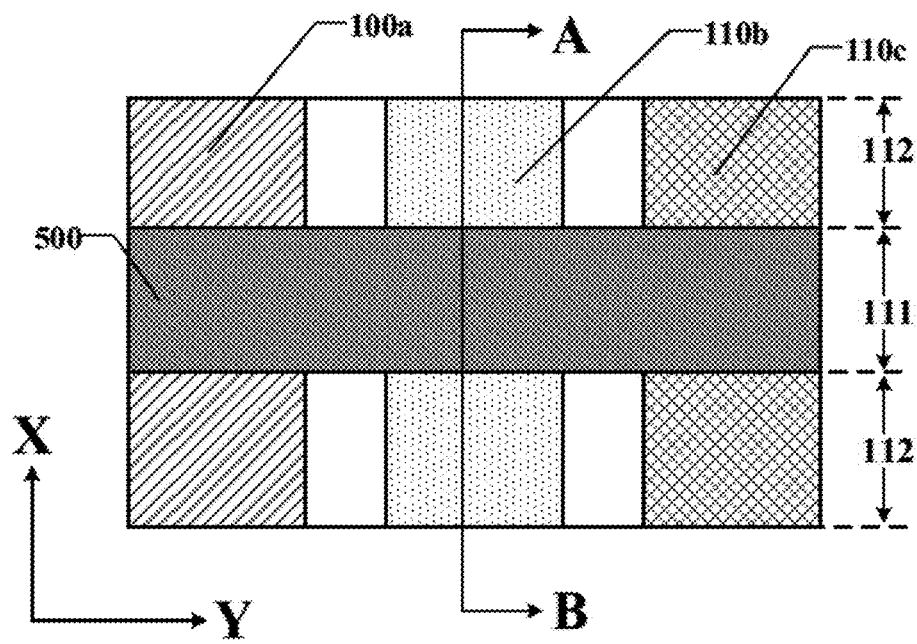
FIG. 15 is a plain view of each individual one of a plurality of subpixels in some embodiments according to the present disclosure.

FIG. 15 is a plain view of each individual one of a plurality of subpixels in some embodiments according to the present disclosure. Referring to FIG. 12, in some embodiments, each individual one of the plurality of subpixels includes two light transmissive parts, and a light blocking part between the two light transmissive parts.

The cross-sectional views of the plurality of subpixels in FIG. 2A to FIG. 5B correspond to cross-sectional views along the direction A to B in the FIG. 15. Referring to FIG. 15, the plurality of subpixels are configured to have different colors. For example, the color of a first subpixel 10*a* of one of the plurality of subpixels, the color of a second subpixel 110*b* of the respective one of the plurality of subpixels, the color of a third subpixel 110*c* of the respective one of the plurality of subpixels are different.

Figure 16A:
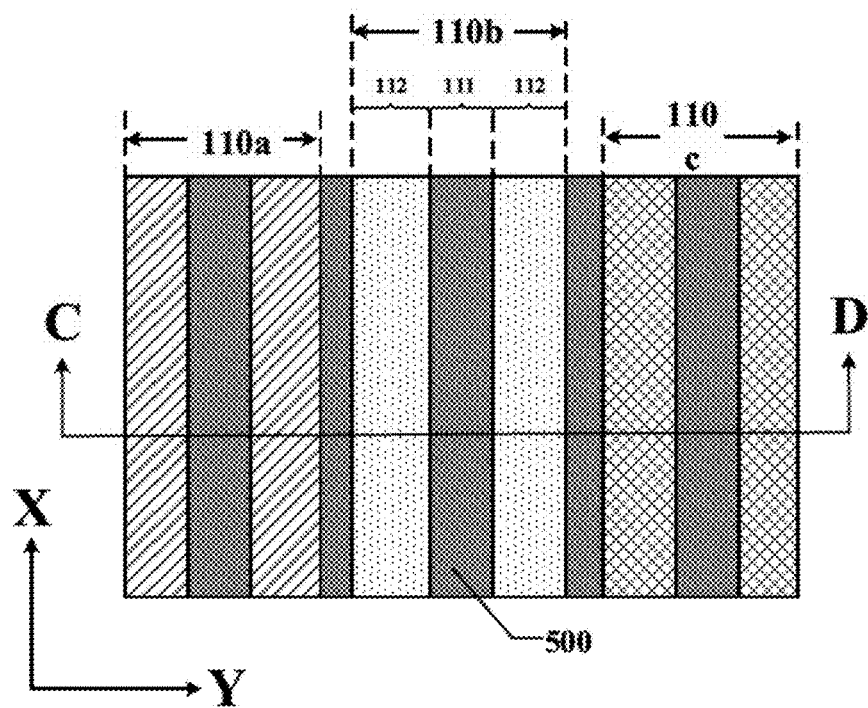
FIG. 16A is a plain view of each individual one of a plurality of subpixels in some embodiments according to the present disclosure.
Figure 16B:
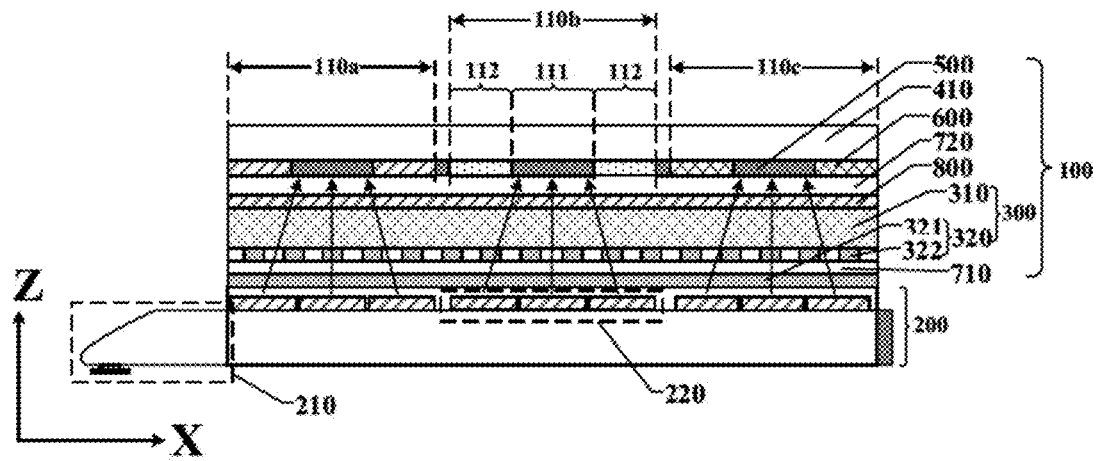
FIG. 16B is a cross-sectional view of a display apparatus in some embodiments according to the present disclosure.

Referring to FIG. 2A to FIG. 5B, each individual one of the plurality of the subpixels 110 includes two light transmissive parts 112, and a light blocking part 111 between the two light transmissive parts 112. Optionally, in each individual one of the plurality of subpixels, light respectively transmits through the two light transmissive parts 112 has the same amount. No brightness difference is formed between the two light transmissive parts 112, which is convenient for independently controlling the gray scale of each individual one of the plurality of subpixels. Optionally, each individual one of the plurality of subpixels 110 may extend along X-axis direction. And the light blocking part 111 of each individual one of the plurality of subpixels 110 may extend along Y-axis. For example, the area of the light blocking part 111 of each individual one of the plurality of subpixels 110 may be decreased to increase the aperture ratio of each individual one of the plurality of subpixels FIG. 16A is a plain view of each individual one of a plurality of subpixels in some embodiments according to the present disclosure. FIG. 16B is a cross-sectional view of a display apparatus in some embodiments according to the present disclosure. FIG. 16B is a cross-sectional view along the direction of C to D in FIG. 16A. Referring to both FIG. 16A and FIG. 16B, in some embodiments, each individual one of the plurality of subpixels 110 extends along X-axis direction. And the light blocking part 111 of each individual one of the plurality of subpixels 110 also extends along X-axis. The light blocking part 111 separates a respective one of the plurality of subpixels 110 to have two light transmissive parts 112, which is convenient for independently controlling the display state of the plurality of subpixels 110.

Referring to FIG. 16B, in the first state, the light emitted from the back light module 200 is transmitted toward the light blocking part 111. In the second state, a first portion of the light transmitted from the back light module 200 is transmitted toward the light transmissive part 112. The amount of light transmitted through the light transmissive part 112 decreases along a direction from a side of the light transmissive part 112 facing the light blocking part 111 toward a side of the light transmissive part 112 away from the light blocking part 111. Optionally, less light or no light is transmitted through the interface region of two adjacent subpixels of the plurality of subpixels 110. For example, less light or no light is transmitted through the interface of the first subpixel 110*a* and the second subpixel 110*b* of the plurality of subpixels 110. Optionally, no light blocking part 111 is disposed between two adjacent subpixels of the plurality of subpixels 110, which may further increase the aperture ratio of the plurality of subpixels 110, and increase the brightness of the image displayed.

In some embodiments, the distribution of light emitted through the plurality of light extraction gratings relates to the shapes of the plurality of light extraction gratings and the arrangement of the plurality of light extraction gratings. Optionally, the shape of the light blocking part is designed based on the parameters of the plurality of light extraction gratings.

Referring to FIG. 9, the light emitted from the back light module is converged light. And each individual one of the plurality of light extraction gratings includes a first sub-grating 220*a*, a second sub-grating 220*b*, and a third sub-grating 220*c*.

Figure 17:
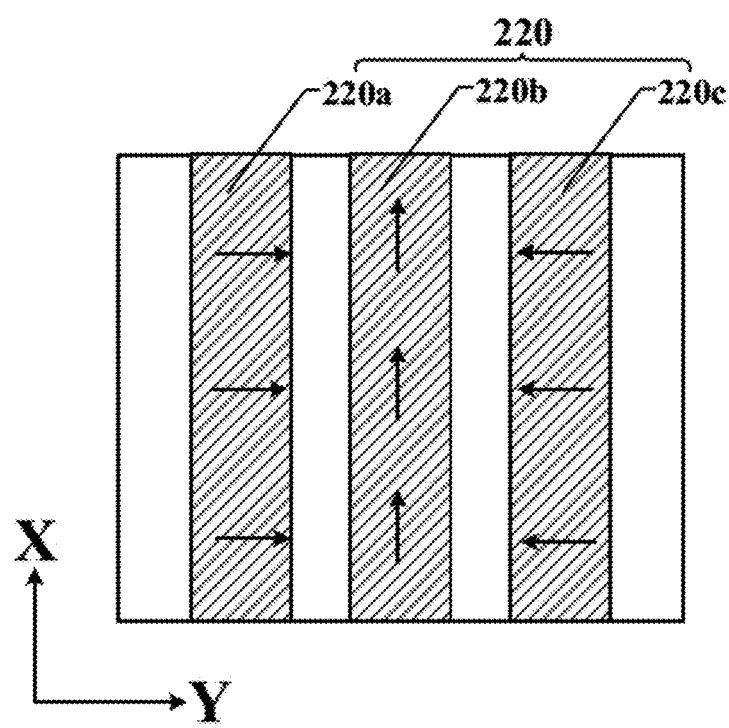
FIG. 17 is a schematic diagram of one of a plurality of light extraction gratings of a display apparatus in some embodiments according to the present disclosure.

FIG. 17 is a schematic diagram of one of a plurality of light extraction gratings of a display apparatus in some embodiments according to the present disclosure. Referring to FIG. 17, in some embodiments, the shapes of the first sub-grating 220*a*, the second sub-grating 220*b*, and the third sub-grating 220*c* are long strip shape. Optionally, the first sub-grating 220*a*, the second sub-grating 220*b*, and the third sub-grating 220*c* extend along a same direction. Optionally, the first sub-grating 220*a* and the third sub-grating 220*c* are configured to extract the light in directions toward a light transmission direction of light directed by the second sub-grating 220*b*. Optionally, the arrangement of the light blocking part and the light transmissive part refers to FIG. 16A or FIG. 16B. Optionally, the number of sub-gratings of one of the plurality of light extraction gratings varies. In one example, one of the plurality of light extraction gratings can have one sub-grating. In another example, one of the plurality of light extraction gratings can have two sub-gratings. In another example, one of the plurality of light extraction gratings can have three sub-gratings.

Figure 18A:
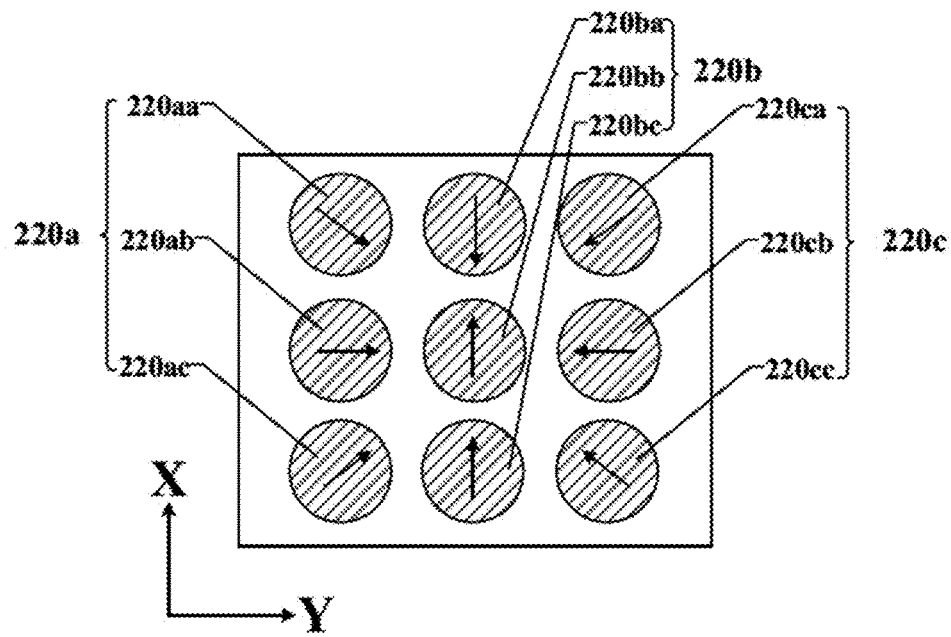
FIG. 18A is a schematic diagram of one of a plurality of light extraction gratings of a display apparatus in some embodiments according to the present disclosure.
Figure 18B:
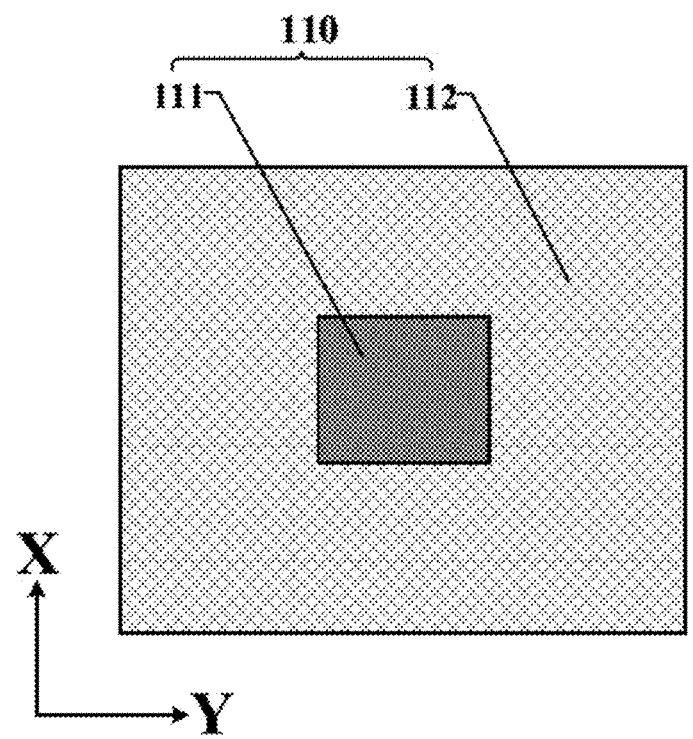
FIG. 18B is a schematic diagram showing a structure of a plurality of subpixels corresponding to the one of a plurality of light extraction gratings in FIG. 18A in some embodiments according to the present disclosure.

FIG. 18A is a schematic diagram of one of a plurality of light extraction gratings of a display apparatus in some embodiments according to the present disclosure. FIG. 18B is a schematic diagram showing a structure of a plurality of subpixels corresponding to the one of a plurality of light extraction gratings in FIG. 18A in some embodiments according to the present disclosure. Referring to both FIG. 18A and FIG. 18B, each individual one of the plurality of light extraction gratings 220 includes a plurality of light extraction parts. Each individual one of the plurality of light extraction parts includes a plurality of grating barriers. Optionally, by arranging the plurality of grating barriers of a respective one of the plurality of light extraction parts, the light transmitted through the respective one of the plurality of the light extraction parts can converge toward a center direction. In one example, a sub-grating 220a includes a first light extraction part 220aa, a second light extraction part 220ab, and a third light extraction part 220ac. A sub-grating 220b includes a fourth light extraction part 220ba, a fifth light extraction part 220bb, and a sixth light extraction part 220bc. A third sub-grating 220c includes a seventh light extraction part 220ca, an eighth light extraction part 220cb, and a ninth light extraction part 220cc. For example, by arranging the plurality of grating barriers in the respective one of the plurality of light extraction part, the first light extraction part 220aa, the second light extraction part 220ab, the third light extraction part 220ac, the fourth light extraction part 220ba, the sixth light extraction part 220bc, the seventh light extraction part 220ca, the eighth light extraction part 220cb, and the ninth light extraction part 220cc are configured to transmit light in a direction toward the light transmission direction of light transmitted by the fifth light extraction part 220bb. Optionally, there is no limitation on the number of the plurality of light extraction parts in each individual one of the plurality of light extraction gratings 220.

Referring to FIG. 18B, the light blocking part 111 is disposed in a center of each individual one of the plurality of subpixels. The peripheral area of the light blocking part 111 is light transmissive part 112. In some embodiments, the area of the light blocking part 11 tends to be zero (ignoring light diffraction), and a ratio of the area of the light transmissive part 112 to the area of a respective one of the plurality of subpixel tends to be 1. In some embodiments, as the ratio of the area of the light transmissive part 112 to the area of a respective one of the plurality of subpixel increases, the aperture ratio of the respective one of the plurality of subpixel increases.

Various appropriate shapes may be chosen for the light blocking part 111. Examples of shapes suitable for the light blocking part 111 include, but not limited to, rectangular, and round.

In some embodiments, the display apparatus further includes black matrix. The black matrix is configured to form the light blocking part. Optionally, the light blocking part is at least a portion of the black matrix. Referring to FIG. 16B, a black matrix 500 is disposed in the display panel 100. In each individual one of the subpixels, the black matrix 500 is configured to be the light blocking part 111. Various appropriate light-absorbing materials may be used for making the black matrix 500. Examples of light-absorbing materials suitable for making the black matrix 500 include, but not limited to, carbon-doped resin materials or metal oxide.

In some embodiments, a color filter is disposed in each individual one of the plurality of subpixels. Optionally, the color filter is disposed on a side of the light transmission direction controller away from the back light module. Optionally, the orthographic projection of the color filter on the back light module partially overlaps with the orthographic projection of the light transmissive part on the back light module. For example, the color filter is configured to display color images.

Referring to FIG. 16B, the color filter is at least partially disposed in the light transmissive part 112. In one example, in the second state, the light, controlled by the light transmission direction controller 300 and transmitted through the light transmissive part 112, transmits through the color filter 600 to display color image. For example, the first subpixel 110a of one of the plurality of subpixels is a red subpixel. The second subpixel 110b of one of the plurality of subpixels is a green subpixel. The third subpixel 110c of one of the plurality of subpixels is a blue subpixel. Respectively, the color filter is red, green, or blue.

Optionally, the color filter includes quantum dots. Different types of quantum dots can be excited to emit different colors of light to display color images. In one example, the quantum dots also have good scattering characteristics, which can further increase the degree of scattering of light emitted from the plurality of subpixels to increase the viewing angle of the display device. In another example, the quantum dots is spherical or spheroidal. For example, the diameters of quantum dots ranges from approximately 2 nm to approximately 20 nm, e.g. approximately 2 nm to approximately 5 nm, approximately 5 nm to approximately 10 nm, approximately 10 m to approximately 15 nm, approximately 15 nm to approximately 20 nm.

Various appropriate types of quantum dots can be chosen. Examples of types of quantum dots include, but not limited to, silicon quantum dots, germanium quantum dots, cadmium sulfide quantum dots, cadmium selenide quantum dots, cadmium telluride quantum dots, zinc selenide quantum dots, lead sulfide quantum dots, lead selenide quantum dots, indium phosphide quantum dots, and arsenic Indium quantum dots.

In another aspect, the present disclosure also provides a display apparatus including the display panel described herein, and one or more integrated circuits connected to the display panel. Examples of appropriate display apparatuses include, but are not limited to, an electronic paper, a mobile phone, a tablet computer, a television, a monitor, a notebook computer, a digital album, a GPS, etc.

In some embodiments, the display apparatus can be any product or any part of a product having display function, such as liquid crystal display panels, electronic paper, OLED panels, mobile phones, tablets, TVs, monitors, laptop, digital photo frame, and navigator.

In another aspect, the present disclosure also provides a display method of the display apparatus herein. The display method includes the light transmission direction controller independently adjusting a grayscale of each individual one of the plurality of subpixels by independently controlling a light distribution ratio between a first portion of light transmitted through the light transmissive part and a second portion of light blocked by the light blocking part in each individual one of the plurality of subpixels.

In one of the plurality of subpixel, in a first state, the light transmission direction controller controls at least a portion of the light emitted from the back light module to transmit toward the light blocking part. In a second state, the light transmission direction controller controls at least a portion of the light emitted from the back light module to transmit toward the light transmissive part. For example, the first portion of light transmitted through the light transmissive part in the first state is smaller than the first portion of light transmitted through the light transmissive part in the second state.

In some embodiments, no polarizer is required to adjust the light transmission direction of the light transmitted through the plurality of subpixels, which may increase the light transmission rate, and increase the brightness of images displayed.

In some embodiments, in the first state, light can be guided toward the light blocking part, the light blocking part can be smaller but can still effectively block the light from transmitting out. The smaller light blocking part may lower the ratio of area of the light blocking part to the area of a respective one of the plurality of subpixels, which may increase the aperture ratio of the respective one of the plurality of subpixels, and increase the brightness of image displayed.

Figure 19:
FIG. 19 is a flow chat illustrating a display method of a display apparatus in some embodiments according to the present disclosure.

FIG. 19 is a flow chat illustrating a display method of a display apparatus in some embodiments according to the present disclosure. Referring to FIG. 19, each individual one of the plurality of pixels works individually. Referring to FIG. 19, the display method of the display apparatus is as follows:

In the first state, the light transmission direction controller controls the light emitted from the back light module to transmit toward the light blocking part of a respective one of the plurality of subpixels. The area of the light blocking part can be decreased to increase the aperture ratio of the respective one of the plurality of subpixels. The area of the light blocking part is determined by the light transmission direction controlled by the light transmission direction controller.

In a second state, the light transmission direction controller controls the light emitted from the back light module to transmit toward the light transmissive part of a respective one of the plurality of subpixels. The area of the light blocking part can be decreased to increase the aperture ratio of the respective one of the plurality of subpixels. The brightness and the contrast of images displayed by the display apparatus is increased, and the display quality of the display apparatus is also improved.

In some embodiments, the display apparatus is a transparent apparatus. Optionally, the display method includes background light transmitted through the display apparatus to display background image. For example, an image displayed by the display apparatus includes a background image and an image formed by the light emitted from the light source.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus, comprising:
a back light module;
a light transmission direction controller on a light emitting side of the back light module; and
a plurality of subpixels on a side of the light transmission direction controller away from the back light module, each individual one of the plurality of subpixels comprising a light transmissive part and a light blocking part;
wherein the back light module is configured to emit light toward the plurality of subpixels;
the light transmission direction controller is configured to independently adjust a grayscale of each individual one of the plurality of subpixels by independently controlling a light distribution ratio between a first portion of light transmitted through the light transmissive part and a second portion of light blocked by the light blocking part in each individual one of the plurality of subpixels; and
the light transmission direction controller comprising a liquid crystal layer and a plurality of liquid crystal control electrodes configured to independently control a state of the liquid crystal layer in each individual one of the plurality of subpixels, thereby independently controlling the light distribution ratio in each individual one of the plurality of subpixels.

2. The display apparatus of claim 1, wherein the plurality of liquid crystal control electrodes are configured to control the liquid crystal layer to form a liquid crystal lens layer.

3. The display apparatus of claim 1, wherein the plurality of liquid crystal control electrodes are configured to control the liquid crystal layer to form a liquid crystal grating.

4. The display apparatus of claim 1, further comprising a plurality of grayscale gratings in the liquid crystal layer and respectively in the plurality of subpixels;
wherein the plurality of liquid crystal control electrodes are configured to independently adjust an equivalent refractive index of the liquid crystal layer in each individual one of the plurality of subpixels, thereby independently adjusting a difference between the equivalent refractive index of the liquid crystal layer and a refractive index of a respective one of the plurality of grayscale gratings in each individual one of the plurality of subpixels.

5. The display apparatus of claim 4, wherein each individual one of the plurality of subpixels has a first image display state and a second image display state;
in the first image display state, the equivalent refractive index of the liquid crystal layer is adjusted to be substantially same as the refractive index of the respective one of the plurality of grayscale gratings; and in the second image display state, the equivalent refractive index of the liquid crystal layer is adjusted to be greater than the refractive index of the respective one of the plurality of grayscale gratings.

6. The display apparatus of claim 1, wherein the back light module comprises:
a light source assembly; and
a light extraction layer on a light emitting side of the light source assembly and configured to extract light out of the light source assembly along a controlled direction.

7. The display apparatus of claim 6, wherein the light source assembly comprises:
a light guide plate having a first main surface and a second main surface facing each other, and a first side surface connecting the first main surface facing the light transmission direction controller and the second main surface facing away the light transmission direction controller; and
a light source configured to emit light into the light guide plate through the first side surface;
wherein the light extraction layer comprises a plurality of light extraction gratings on one of the first main surface and the second main surface, and configured to extract light emitted from the light source into the light guide plate out of the light guide plate.

8. The display apparatus of claim 7, wherein the light source assembly is configured so that the light emitted from the light source into the light guide plate is totally reflected in the light guide plate, and is extracted out of the light guide plate by the plurality of light extraction gratings.

9. The display apparatus of claim 8, wherein the first main surface is the light emitting side; and
the plurality of light extraction gratings are configured to extract light out of the light guide plate along a direction substantially perpendicular to the light emitting side.

10. The display apparatus of claim 8, wherein the first main surface is the light emitting side; and
the plurality of light extraction gratings are configured to extract light out of the light guide plate, at least a portion of extracted light being transmitted along a direction inclined to the light emitting side.

11. The display apparatus of claim 10, wherein each of the plurality of light extraction gratings in a respective one of the plurality of subpixels comprises a first sub-grating, a second sub-grating, and a third sub-grating; and
wherein, in one image display state of a respective one of the plurality of subpixels, the second sub-grating is configured to extract light out of the light guide plate along a direction substantially perpendicular to the light emitting side, each of the first sub-grating and the third sub-grating is configured to extract light out of the light guide plate along a direction inclined to the light emitting side, and light extracted by the first sub-grating and the third sub-grating converges with light extracted by the second sub-grating.

12. The display apparatus of claim 7, wherein the plurality of light extraction gratings are a plurality of transmissive-type gratings on the first main surface;
wherein the back light module further comprises a filing layer filling gaps in the plurality of light extraction gratings to form a planarized surface; and
a refractive index of the filing layer is less than a refractive index of the light guide plate.

13. The display apparatus of claim 7, wherein the plurality of light extraction gratings are a plurality of reflective-type gratings on the second main surface.

14. The display apparatus of claim 7, wherein the light guide plate has a second side surface facing the first side surface; and
the back light module further comprises a light absorption layer on the second side surface configured to absorb light transmitted to the second side surface.

15. The display apparatus of claim 7, wherein the light source further comprises a first reflective mirror and a second reflective mirror;
the first reflective mirror is configured to reflect light from a light illuminant to transmit along a first direction;
the second reflective mirror is configured to reflect at least a portion of light reflected by the first reflective mirror to transmit along a second direction; and
the second reflective mirror has a substantially flat reflective surface.

16. The display apparatus of claim 1, wherein each individual one of the plurality of subpixels comprises a single light transmissive part; and
the light blocking part is on a side of the single light transmissive part.

17. The display apparatus of claim 1, wherein each individual one of the plurality of subpixels comprises two light transmissive parts; and
the light blocking part is between the two light transmissive parts.

18. The display apparatus of claim 1, wherein the display apparatus further comprises a color filter in the light transmissive part; and
the color filter is a quantum dots color filter.

19. A method of driving a display apparatus, wherein the display apparatus comprises:
a back light module;
a light transmission direction controller on a light emitting side of the back light module; and
a plurality of subpixels on a side of the light transmission direction controller away from the back light module, each individual one of the plurality of subpixels comprising a light transmissive part and a light blocking part;
wherein the back light module is configured to emit light toward the plurality of subpixels; and
the light transmission direction controller is configured to independently adjust a grayscale of each individual one of the plurality of subpixels by independently controlling a light distribution ratio between a first portion of light transmitted through the light transmissive part and a second portion of light blocked by the light blocking part in each individual one of the plurality of subpixels;
wherein the light transmission direction controller comprising a liquid crystal layer and a plurality of liquid crystal control electrodes configured to independently control a state of the liquid crystal layer in each individual one of the plurality of subpixels, thereby independently controlling the light distribution ratio in each individual one of the plurality of subpixels;
wherein the method comprises independently controlling a respective one of the plurality of subpixels to be in a first image display state or in a second image display state by the light transmission direction controller;
wherein, in the first image display state, the light transmission direction controller is configured to control light emitted toward the respective one of the plurality of subpixels to be substantially blocked by the light blocking part of the respective one of the plurality of subpixels; and in the second image display state, the light transmission direction controller is configured to control light emitted toward the respective one of the plurality of subpixels to at least partially transmit through the light transmissive part of the respective one of the plurality of subpixels.

\* \* \* \* \*